United States Patent [19]

Schrieber

[11] Patent Number: 4,686,634

[45] **Date of Patent: * Aug. 11, 1987**

[54] METHOD AND APPARATUS FOR GENERATING A SET OF SIGNALS REPRESENTING A CURVE

[75] Inventor: Ricky J. Schrieber, Great Neck, N.Y.

[73] Assignee: Allied Corporation, Morris Township, Morris County, N.J.

[ * ] Notice: The portion of the term of this patent subsequent to Jun. 16, 2004 has been disclaimed.

[21] Appl. No.: 649,040

[22] Filed: Sep. 10, 1984

[51] Int. Cl.[4] ........................ G06F 15/72; G09G 1/06

[52] U.S. Cl. .................................... 364/523; 340/728; 340/748; 364/518

[58] Field of Search ............... 364/523, 520, 300, 518, 364/521, 522; 340/748, 728, 731, 732

[56] References Cited

U.S. PATENT DOCUMENTS

| | | | |
|---|---|---|---|
| 3,746,912 | 7/1973 | Redecker et al. | 340/732 X |
| 4,029,947 | 6/1977 | Evans et al. | 364/523 X |
| 4,074,281 | 2/1978 | Quarton | 364/718 X |
| 4,199,815 | 4/1980 | Kyte et al. | 364/523 |
| 4,254,468 | 3/1981 | Craig | 364/523 |
| 4,272,808 | 6/1981 | Hartwig | 364/521 X |
| 4,298,945 | 11/1981 | Kyte et al. | 364/523 |
| 4,338,673 | 7/1982 | Brown | 364/523 |
| 4,342,096 | 7/1982 | McDevitt | 364/523 X |
| 4,476,464 | 10/1984 | Hobbs | 340/748 X |
| 4,527,154 | 7/1985 | Tanaka | 340/748 X |
| 4,555,802 | 11/1985 | Fedak et al. | 340/728 X |

*Primary Examiner*—Errol A. Krass

*Assistant Examiner*—Kevin J. Teska

*Attorney, Agent, or Firm*—A. J. Cortina; W. F. Thornton

[57] ABSTRACT

A method and system is shown for generating a series of signals representing nodes on a locus of a curve partially defined by a set of related knots, using a Hermite cubic parametric polynomial relationship, with said knots defining the end points of respective segments of said curve locus and with said knots being in a successive order in relation to said locus, and for encoding said node signals as data for use when representing said curve segments in a separate additional process responsive to the shape of said curve locus, as represented by said encoded node signals.

16 Claims, 15 Drawing Figures

EDITING OVERIDE CONTROL CODE 9

EDITING OVERIDE CONTROL CODE 10

METHOD AND APPARATUS FOR GENERATING A SET OF SIGNALS REPRESENTING A CURVE

This application is related to applications with Ser. Nos. 649,011, 649,041, 649,012, 649,095, 649,021, 649,088, and 649,096, all filed on the same day as this application and all assigned to Allied Corporation.

FIELD OF THE INVENTION

This invention relates to the field of encoding data related to a variable size character for access and display, and particularly, to the encoding of display points projected in the shape of a continuous smooth curve. The field of this invention is the field of character and symbol generation with continuous and smooth outline curves.

DESCRIPTION OF THE PRIOR ART

The prior art contains many examples of character generating methods and systems. One such example is U.S. Pat. No. 4,029,947 ('947) which generates characters from a single encoded master but uses straight line interpolation to approximate curves between a set of given points. Other encoding systems are shown in U.S. Pat. No. 4,298,945 ('945) and U.S. Pat. No. 4,199,815 ('815) which also show a system of encoding straight lines using the end points and then interpolating points on the locus of straight lines between the end points and about the outline of a character. A further patent is U.S. Pat. No. 4,338,673 ('673), which stores a character in a single size by encoding straight line outlines of the character and then uses that encoding to generate points along straight line approximations of the outline at a desired size, as in the '945 patent and the '815 patent.

However, these and other curve generation techniques do not use a system whereby the coordinate points on the outline of a character are encoded in a single master and then, by utilizing a parametric cubic expression of a single variable, a series of signals describing nodes on the locus of a smooth continuous curve between those points, are generated for display of the character at any variable size.

Parametric cubic curves are known and shown in "Fundamentals of Interactive Computer Graphics", J. D. Foley and Andries Van Dam; Addison Wesley, Reading, Mass., 1982. Shown therein are parametric cubic curves, as functions of a single variable, used to represent curve surfaces.

Further, $T_EX$ and METAFONT, Donald E. Knuth; American Math Society, Digital Press, Bedford, Mass., 1979, shows the use of a parametric cubic curve wherein, given the coordinate positions of a set of end points and the first derivative (slope) of a curve at the end points, a parametric cubic polynomial (a function of a single parameter t), can be used to generate the locus of points on a smooth continuous curve segment between those end points. As shown by Knuth, the locus of each curve segment depends on the location of the two end points of that segment, for example, $Z_1$ and $Z_2$, and the angle of the curve at $Z_1$, determined by the location of adjacent points $Z_0$, $Z_2$ and $Z_3$. In fitting the curve between two end points, the angles at $Z_1$ and $Z_2$ are predetermined by Knuth. For example, where the curve is from $Z_0$ to $Z_1$ to $Z_2$, Knuth assumes, as a rule, the direction the curve takes through $Z_1$ is the same as the direction of the arc of a circle from $Z_0$ to $Z_1$ to $Z_2$. However, not all curved outlines will satisfy this rule and, in many cases, Knuth requires a further adaptation of that foregoing process to produce the desired shape, namely of a curve representing the actual smooth curved outline of a character.

Knuth's process starts using the rule described above specifying a circle when fitting a curve between three given points $Z_1$, $Z_2$, $Z_3$. Knuth does show that a parametric cubic curve as a function of a single parameter t, as also shown in "Fundamentals of Interactive Computer Graphics", can be modified, as shown on page 20 of Knuth, to include "velocities" specified as "r" and "s" and which are functions of the entrance angle and exit angle of the curve segment at the given end points. The velocities' values determine how the resulting curve will vary as a function of t, either slowly describing a longer curve distance or more quickly describing a shorter curve distance. The r and s formulas are arbitrary and, in the case shown by Knuth, are chosen to provide excellent approximations to circles and ellipses when $\theta$ equals $\phi$ and $\theta+\phi$ equals 90 degrees. Additional properties chosen to be satisfied by Knuth's arbitrary formulas for r and s are further described in $T_EX$ and METAFONT.

In addition to Knuth's internal requirement to specify an entrance and exit angle at the curve end points, where no previous angle or curve history is given, Knuth also must use the circle approximation rule, specified above, for each of the end points on the curve. This means that where the actual curve to be generated is not accurately produced by the Knuth circle approximation, an adjustment must be made. Knuth makes this adjustment by manipulating adjoining points. For example, where the curve is to be fit between points $Z_1$, $Z_2$ and $Z_3$. Knuth may manipulate the locations of $Z_0$ or $Z_1$ or $Z_3$ or $Z_4$ to obtain an accurate fit. A further problem in Knuth occurs when the sign of $\theta$ is the same as the sign of $\phi$ implying (a) the curve entrance angle at point $Z_1$ is in the same quadrant as the curve exit angle at $Z_2$, (b) a sine wave between $Z_1$ and $Z_2$ and (c) an inflection point. Knuth must resort to a manipulation of point locations to obtain a desired smooth curve around the inflection point.

In summary, the processes described above for producing outlines and showing the use of a parametric cubic curve expressed as a polynomial capable of generating a series of points along the locus of a curve between two given points can only do so with the disadvantages noted above. In the following summary of the invention, the method and system for using a parametric cubic curve which accurately reproduces a curve section between given points is shown and described and which method and system avoids the disadvantages discussed above.

SUMMARY OF THE INVENTION

This invention has as its object the generation, encoding and display of a series of points (nodes) along the locus of a curve segment between two given end points which are defined as "knots". It has been specifically developed to generate the locus of points (nodes) along the smooth curved outline of characters or symbols between given knots (i.e., $Z_{a-1}$, $Z_a$, $Z_{a+1} \ldots Z_{n-1}$, $Z_n$), but it should be understood that its use is not necessarily limited to that purpose but may be used to generate and display smooth continuous curves between any end points, regardless of the application.

In the case of the applicant's preferred embodiment, the knots are coordinate points along the outline of a character, which may be an alphanumeric or any other character or symbol and which coordinate points may be representative of a master size encoded character at a normalized size, on a dimensionless normalized encoding grid. The coordinate points may be encoded for display at a predetermined normalized display size or at an expanded or reduced size. The knots may be along any outline or surface whether two or three dimensional, although the applicant's preferred embodiment is shown in a two-dimensional model for use in smooth continuous curve generation. Using the method and system of applicant, the nodes along a two-dimensional curve or three-dimensional surface locus may be generated. The system shown herein generates the nodes using the encoded knot positions and the slopes of the curve at the knots. The process generates signals representing the nodes' coordinate values and is based upon the length (Z) between the knots and the angular interrelationship (B) of each of the knots with respect to a reference angle on the encoding grid.

In the preferred embodiment, the knots' coordinates are encoded in a closed data loop and represent dimensionless coordinates about the closed outline loop of the character or symbol. The method described herein enters the closed data loop at a set of encoded coordinates representing a knot on the closed outline loop and initiates the node generating process by using the angular interrelationships of the knots about that entry knot. However, other methods may be used to initiate the process without departing from the inventive concept. In applicant's preferred embodiment, once having entered the encoded closed data loop, the analysis may proceed in a clockwise or counterclockwise direction around the closed data loop.

It should be understood that the principles of this invention are not limited to a closed outline loop or closed data loop, but may be applied to open outline loops and to open data loops.

The process may be used to generate either a smooth continuous curve between the knots or some other form of curve, forming a cusp at a knot for example, and which although continuous, it is not smooth at all locations but angular, as in the shape of a "K" or "G". In the preferred embodiment of the invention, the selection of a smooth continuous curve or merely a continuous curve, having a cusp for example, is made using stored rules which serve as default command codes which use the interknot angles formed between the knots, and the distance between the knots to produce a desired result. For example, where the angle formed by two knots is in excess of a predetermined threshold angle, a default command code may direct that a cusp be formed. Other rules such as override control codes may be similarly used to force a cusp or smooth curve, regardless of the threshold conditions and which may be encoded in the closed data loop to override the default command codes as explained below.

Assuming, for the purpose of explaining the invention, it is desired to connect all knots in the closed outline loop with smooth continuous curves, the angles formed between an entrance knot at which the representative encoded data loop is entered and the first and second successive knots thereto in a chosen progression of knots in the closed outline loop are averaged to produce average angle values. As the curve formed between knots is a continuation of a curve which enters at the first of the knots ($Z_a$), and which exists at successive or at a second of the knots ($Z_{a+1}$), the tangent angles of the curve, which are the entrance angle at the first knot and exit angle at the second knot can be specified as average angles. The analysis continues by proceeding around the closed outline loop in the established progression of knots and the order thereof of the knots and examining the angles formed between the knots as described above.

As the knots form a master skeletal outline of the character or symbol when juxtaposed on a dimensionless encoding grid, arranged at a normalized size, the knots may be rotated or scaled relative to such a normalized encoding grid. Once the master encoded character or symbol (master encoded character) is scaled and positioned as desired, then the analysis described above, may continue wherein (a) the encoded closed data loop of knots in the closed outline loop is entered at a first set of coordinates representing a first knot, (b) the angular and spacial relationships of the knots on the normalized encoding grid are determined, using the representative encoded data and (c) for each set of knots along the closed outline loop, assuming that each knot is to be connected by a continuation of a smooth curve, the average angles of the respective curve segments entering and exiting the respective knots are determined. Where a smooth continuous curve is desired, then the entrance angle of the curve segment at a knot would normally be the same as the exit angle of the curve from that same knot.

By using the foregoing method of analysis, namely, determining the average angles made by the curve passing through the knots, and using those average angles to represent the slope of the tangents to the particular curve segment at the respective knots, the disadvantages shown in the prior art are overcome.

In particular, in this inventive concept, there is no need to define a circle between the knots and then compute the locus of nodes on the circle as Knuth does. A faster process results using this invention which requires only the interknot angles of the knots relative to each other and to a reference angle be known. The process as stated above, uses a parametric cubic polynomial relationship of a single variable t to generate signals or data, indicative of and representing the coordinates of nodes on the locus of a smooth continuous curve segment between sets of respective knots. Where a greater resolution and greater number of nodes is needed to describe the locus, then the incremental value of the parameter t, may be decreased providing a greater number of discrete cumulative values of t and node coordinates. Where less resolution and fewer nodes are needed to define the locus, then the incremental value of t can be enlarged, producing fewer discrete cumulative values of t and nodes.

In the preferred embodiment, the dimensionless normalized master encoding grid represents an EM Square ($M^2$) of 864 by 864 Dimensionless Resolution Units (DRU's) in each of the X, Y axes. The $M^2$ is a measure used in the typesetting trade wherein a character is set within an $M^2$ and is shown herein in a manner consistent with the application of the inventive principles in the preferred embodiment. When the master encoded character is to be displayed, the master encoded character, at a normalized size on the normalized encoding grid is scaled, the knot coordinate positions at the scaled size are encoded and expressed in the appropriate display intercept units such as Raster Resolution Units (RRU's). These scaled encoded knots in the preferred embodiments are expressed in terms of the display RRU's and used to determine the incremental value of t. The incremental vaue of t is used to generate discrete cumulative values of t which are then applied to the cubic parametric polynomial to generate the node coordinates. Then through the cubic parametric polynomial relationship, signals indicative of the coordinates of the nodes are generated and stored as data. As defined by a parametric expression of a single parameter t, the resultant node's x, y coordinate values (X or Y are the axial directions in the preferred embodiment), vary separately as separate functions of t [i.e. x(t), y(t)]. At the scaled size, the incremental value of t may be related to the reciprocal of the distance between knots expressed in RRU's (i.e. $Z_d=|Z_n-Z_{n-1}|$) or any other suitable method may be used to produce a value of t. Values representing the node coordinates are then generated using these incremental values of t, each value being added, to the previous cumulative values (with the second incremental value of t being added to the first incremental value of t and the third incremental value of t being added to the previous cumulative value of t and so on). In the preferred embodiment, the value of t is set to vary from 0 to 1.

The resulting series of signals, stored as encoded data, represent knots and nodes which define the locus of the smooth continuous curve between the knots and the outline of the character or symbol is a machine part ultimately used to control or modulate a display to form the desired character or symbol at the desired size, in a visual image. The resultant data may be run length data, which is applied directly to a raster beam, to position the beam and energize the beam accordingly, or may be used to control a free running raster. Interpolation, rounding or truncating of value may be used to locate the nodes on the display intercepts corresponding to the raster line locations, where exact coincidence is lacking.

As previously stated, as characters or symbols are not always smooth curves but may contain cusps, a threshold test may be used, such as one based on the exterior angle formed by lines between knots. Where that exterior angle at a knot is greater than a predetermined threshold angle, for example, a cusp may be assumed. It being understood, however, that if the exterior angle is less than the threshold angle, the analysis previously described with regard for producing a locus of nodes to define a smooth continuous curves would be used.

In the preferred embodiment, the master encoding grid is a Cartesian coordinate system. As the preferred embodiment is used in typesetting, the encoding grid relative to which the character is encoded is set within an $M^2$, which in the preferred embodiment contains 864 by 864 Dimensionless Resolution Units (DRU's). The master encoded character, at its normal size is set over a portion of the available normalized encoding grid area of the $M^2$. As is known in the typesetting field, expansion areas in the $M^2$ are also provided for large size characters. The character may be scaled, rotated or projected by ordinary known techniques and new coordinates for the knots may be determined accordingly, as is known in the art. In the preferred embodiment, the scaling is done in increments of 1/1024 DRU's. The new coordinate locations of the knots for the character at its scaled, rotated or projected positions are determined. As only integers are used in the preferred embodiment, any fraction or equivalent thereof is discarded. In the process, the percent of reduction or enlargement is first calculated in relation to a desired character size in units of typesetter's points. The precision of the scaling is increased by an autoscaling linear interpolation increaseing the resolution of the linear interpolation, as explained below. The result is a scaled coordinate point in RRU's without the need to utilize floating point arithmetic.

In the preferred embodiment and as stated above, override control codes are accessed responsive to data stored with the stored knot coordinates to reduce storage and the processing time.

The code 0 is used to indicate the end of all the loops.

A code 1 is used to indicate the movement in a relatively long direction on an axis, for example, the X axis. In this case, an X value is replaced with a new X coordinate value.

The code 2 indicates the same process as a code 1 for another axis, for example, the Y axis direction, where the Y value is replaced with a new Y coordinate value.

A code 3, as in codes 1 and 2, indicates X and Y are both replaced with new coordinate values.

A code 4 indicates the finish of a previous encoded loop and the start of a new loop.

Codes 5, 6 and 7 indicate that the X, Y or XY directions are respectively altered.

Codes 8 to 11 are editing commands forcing predetermined conditions for the curve at the respective knots as will be described.

The knots may be encoded in the closed data loop on a 4-bit memory boundry (nibble) and in the preferred embodiment, the first nibble value of a complete information set of nibbles is used to specify the number of nibbles used in the complete information set.

Additionally, the data is packed in a novel manner which can be interpreted as spacial information or control codes, as will be explained.

In summary, the inventive concept is a process and system for transforming a machine art, in the form of signals, encoded as data and representing a pattern of knots on the outline of a master size symbol, into a similar pattern at a reduced or enlarged size or transposed in space, by generating a series of encoded data signals representing nodes which more definitely define the said pattern in the shape of smooth continuous curves or cusps and which data signals may be directly used to control a display process to visually display the pattern.

Accordingly, what is disclosed is a method and system for generating a series of signals representing nodes on a locus of a curve partially defined by a set of related knots, encoded as data, with said knots defining the end points of respective segments of said curve locus and with said knots being in a successive order in relation to said locus, and for encoding said node signals as data for use when representing said curve segments in a separate additional process responsive to the shape of said curve locus, as represented by said encoded node signals. The method and system involve defining the locations and the successive order of said knots on said curve locus and encoding as data, signals indicative of said knots, then for a first knot, ($Z_a$), representing a first end point of a first curve segment, deriving a first angle, indicative of the average of the interknot angles between said first knot ($Z_a$), and selected related knots and encoding as data, signals indicative of said first angle, at a second of said knots ($Z_b$), representing a second end point of said first curve segment, establishing a second angle for said first curve segment, and encoding as data, signals indicative of said second angle, establishing a compiler for compiling data according to a cubic parametric polynomial relationship between a parameter "t", said knots and angles at the said end points of a said curve segment and the locus of a said curve segment, establishing a range "R" of values for said parameter "t", applying said signals indicative of the said locations of said first and second knots of said first curve segment, to said compiler, applying said signals indicative of the said first and second angles of said first curve segment to said compiler, applying a signal indicative of a distinct selected value of said parameter "t" within said range "R", to said compiler to derive a signal indicative of a respective node location on said first curve segment, repeating the above by applying signals indicative of additional distinct selected values of said parameter "t", within said range "R", to derive a plurality of signals indicative of respective node locations on said locus of said first curve segment for respective distinct selected values of said parameter "t", and encoding said signals derived in step (h) and (i), in a data base to represent said first curve segment.

Further disclosed is a method of encoding data and an encoded data system representing knots on an outline defined relative to a coordinate plane involving selecting sets of coordinates on said outline, to represent the knots, establishing a successive order of said knots, encoding said knots in a data order indicative of said knot order, and encoding by encoding a complete information set of data providing a control code indicative of either (i) the coordinate locations of said knots or (ii) a knot's direction relative to others of said knots or (iii) a predetermined shape of said outline between a pair of said knots or (iv) data indicative of the shape of said outline at a knot or (v) encoding a complete information set providing the coordinate distances between adjacent knots.

Further disclosed is a method and system for encoding data representing knots on an outline defined relative to a coordinate plane and for generating a series of signals representing nodes on the locus of a curve partially defined by said set of knots, involving selecting sets of coordinates on said outline, to represent said knots, establishing a successive order of said knots, encoding said knots in a data order indicative of said knot order, and encoding a complete information set of data providing a code indicative of a predetermined shape of said outline between a pair of said knots or a complete information set providing the coordinate distances between adjacent knots.

Further disclosed is a method and system for generating a series of signals representing nodes on a locus of a curve partially defined by a set of related knots, encoded as data, with said knots defining the end points of respective segments of said curve locus and with said knots being in a successive order in relation to said locus, and for encoding and decoding said node signals as data and for use of said data when in an imaging process responsive to the shape for said curve segments as represented by said encoded data, involving defining the locations and the successive order of said knots on said curve locus and encoding as data, signals indicative of said knots, for a first knot, ($Z_a$), representing a first end point of a first curve segment, deriving a first angle, indicative of the average of the interknot angles between said first knot ($Z_a$), and selected related knots and encoding as data, signals indicative of said first angle, at a second of said knots ($Z_b$), representing a second end point of said first curve segment, establishing a second angle for said for said first curve segment, and encoding as data, signals indicative of said second angle, establishing a compiler for compiling data according to a cubic parametric polynomial relationship between a parameter "t", said knots and angles at the said end points of a said curve segment and the locus of a said curve segment, establishing a range "R" of values for said parameter "t", applying said signals indicative of the said locations of said first and second knots of said first curve segment, to said compiler, applying said signals indicative of the said first and second angles of said first curve segment to said compiler, applying a signal indicative of a distinct selected value of said parameter "t" within said range "R", to said compiler to derive a signal indicative of a respective node location on said first curve segment, repeating the above by applying signals indicative of additional distinct selected values of said parameter "t", within said range "R", to derive a plurality of signals indicative of respective node locations on said locus of said first curve segment for respective distinct selected values of said parameter "t", encoding said signals derived above in a data base to represent said first curve segment accessing said data base signals, and controlling an imaging means responsive to said accessed signals to reproduce said curve.

Further disclosed is a method and system for linear interpolation of coordinate points between first and second end points, to produce coordinates on a straight line outline and where said coordinates are located on a coordinate system having a first coordinate direction and second coordinate direction and encoded in machine readable data words a radix "r", corresponding to the order of values for designated positions in said data words, involving encoding a first data word of "N" positions corresponding to the distance between the said first and second end points in the said first coordinate direction and placing said first data word into a first machine location, encoding a second data word of "M" bits corresponding to the distance between said first and second end points in said second coordinate direction and placing said second data word into a second machine location, determining the number of available positions, between the most significant position of said first data word and the most significant position of said first machine location, available for shifting said first data word in a first direction of the most significant positions of said first machine location, shifting said first data word by a maximum number of positions, equal to the said number of available positions in said first direction and the number of positions corresponding to the number of significant positions used to encode said second data word, and increasing the scale of said first data word by a scale factor related to the number of said positions shifted, deriving a third data word indicative of said second data word in said second machine location divided into said first data word shifted according to step (d), encoding data words indicative of the coordinate of said straight line in said second coordinate direction, for respective ones of said data words encoded according to step (f) encoding a multiple of said third data word, which are related to a respective coordinate in said first coordinate direction, on said straight line, reducing the scale of said multiples of said third data words above, to the scale of the first data word established prior to the above said shifting and encoding said third data words produced above with respective coordinates in said second coordinate direction to produce said coordinates on said straight line.

Further disclosed is encoding data representing knots on an outline defined relative to a coordinate plane and for decoding said encoding data for use in a display process to produce images of said outlines represented by said encoded data by selecting sets of coordinates on said outline, to represent said knots, establishing a successive order of said knots, encoding said knots is a data order indicative of said knot order, the encoding including encoding a complete information set of data providing a control code indicative of either (i) the coordinate locations of said knots or (ii) a knot's direction relative to others of said knots or (iii) a predetermined shape of said outline between a pair of said knots or (iv) data indicative of the shape of said outline at a knot, or (v) providing data indicative of the coordinate distances between adjacent knots, decoding said complete information sets in a decoding order related to said data order responsive to said complete information set being indicative of the coordinate distances between adjacent knots, producing an image of a smooth continuous curved outline or a straight line between said adjacent knots or, responsive to said complete information set being indicative of a said control code, as set forth in (i), (ii), (iii), or (iv), producing an image of a smooth continuous outline or a straight line according to the said coordinate locations of said knots relative to adjacent knots in said successive knot order or producing an image of said outline being smooth at respective knots or being sharp and forming cusps at respective knots.

Further disclosed is encoding data representing knots on an outline loop defined relative to a coordinate plane, for producing a display image of said outline and decoding responsive to the interrelationship of said knots of said outline loop, and imaging said outline loop responsive to said decoded data involving selecting sets of coordinates on said outline loop, to represent said knots, establishing a successive order of said knots, encoding said knots in a data order indicative of said knot order, encoding a complete information set of (i) data indicative of the coordinate distances and interknot angles between adjacent knots, comparing the relative positions of successive knots to at least a first interknot criterion, responsive to said step (d) of comparing, (i) producing a first indication that a set of said successive knots is within said criterion, or (ii) producing a second indication that a set of said successive knots is outside said criterion, and (i) responsive to said first indication imaging said outline loop in the form of a smooth continuous curve, or (ii) responsive to said second indication, imaging said outline loop in the form of a straight line, between said set of successive knots.

Further disclosed is encoding and accessing a single data set of solution values functionally related to and representing the solution set to at least two domains of a variable, involving defining a single data set of solution values functionally related to a first domain of variable and to a second domain of a variable, arranging said data set of solution values in an order related to said first domain and said second domain, accessing said data set of solution values relative to respective values in said first domain to derive at least a part of said solution set to said first domain, and accessing said data set of solution values relative to respective values of said second domain to derive at least a part of said solution set to at least said second domain.

BRIEF DESCRIPTION OF THE DRAWINGS

FIG. 1*d* and FIG. 1*e* shows in greater detail the deviance angles of the curve segment $Z_a$, $Z_{a+1}$, at the respective entrance and exit knots, as functions of the interknot angle (B) and the entrance and exit angles, and.

DESCRIPTION OF THE PREFERRED EMBODIMENT

As stated in the summary, the object of this invention is to generate a series of display signals, representing nodes describing the locus of a smooth continuous curve at a desired size, from a normalized curve encoded as a set of encoded knots. Normalized is used in its general and ordinary meaning to denote a norm or standard size. However, as would be apparent to those skilled in the art, the displayed curve described in terms of display intercept coordinates (RRU's) is dependent upon the resolution of the display, and the rate or relationship between the number of raster resolution units (RRU's) at given display resolution to the dimensionless resolution units (DRU's) in which the curve is encoded at its normalized size and on the normalized grid. The normalized encoded curve may also be thought of as a master which is encoded at a master size relative to the master encoding grid which may have any suitable coordinate system and which after scaling, may be used to generate the encoded data representing display intercepts in raster units, at a given raster resolution for any desired display size character. As the inventive concepts disclosed herein are used in the typesetting industry to produce typeset composition containing characters having curved outlines in conformance to the highest graphic standards, scaling starts with a determination of the desired size of the character in any chosen system of measurement. In the preferred embodiment, character size is expressed in printer's points (351.282 micrometers/point or 0.01383 inches/point). It being understood, however, that the invention can be used in connection with other units of measurements and with applications outside the printing or typesetting industry, without deviating from or changing the inventive concepts shown herein. The invention, as described herein is with reference to the printing industry, where the master encoding grid is made synonymous with a dimensionless encoding grid in the form of a typesetting $M_2$. This is the application of the preferred embodiment of the invention and discloses the best mode of using the invention.

Figure 1A:
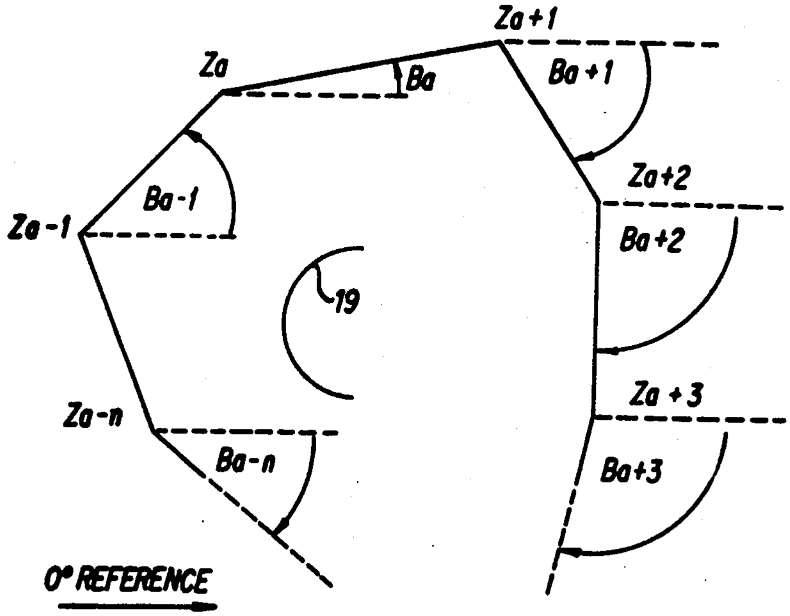
FIG. 1*a* shows a set of knots (i.e. $Z_a$, $Z_{a+1}$, $Z_{a+2}$, . . . ) forming the skeletal outline of a master encoded character.

The problem solved by this invention may be best considered by viewing FIG. 1*a* which shows a series of data encoded knots ($Z_{a-1}$, $Z_a$, $Z_{a+1}$, $Z_{a+2}$ . . . ) on a dimensionless encoding grid having coordinates in the X and Y axial directions, with the X direction coinciding with a zero degree (0°) reference angle. It should be understood, however, that any system of coordinates can be used with any reference angle chosen without changing the manner in which the inventive concepts are used.

Figure 1B:
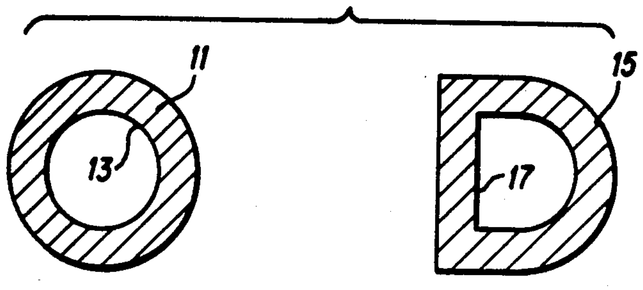
FIG. 1*b* shows the closed outline loops with reference to a character.

As shown in FIG. 1*a*, a number of knots $Z_{a-1}$, $Z_a$, $Z_{a+1}$, $Z_{a+2}$, $Z_{a+3}$ inclusive to $Z_{a-n}$ represent an outline loop which may be smooth and continuous over a series of such knots or continuous without being smooth over a series of such knots or a combination of the foregoing. As stated, the knots represent the skeletal outline of a predetermined normalized or master size character or symbol (hereinafter referred to as master size character), on a juxtaposed dimensionless encoding grid where the coordinates have dimensions of Dimensionless Resolution Units (DRU's). In the case of the encoded character, the master size is with reference to the normalized encoding grid and the area within the grid. The interknot angles between the knots, with reference to the reference angle, are shown as generally denoted by "B" and particularly as $B_{a-1}$, $B_a$, $B_{a+1}$ and so on for the interknot angles at respective knots $Z_{a-1}$, $Z_a$, $Z_{a+1}$ and so on. FIG. 1*a* shows a skeletal outline as may be typically used for symbol wherein all the knots $Z_{a-1}$ through $Z_{a-n}$ on the symbol outline are arranged on a closed outline loop. This relationship in its simplest form could be shown by the knots for the outline of an O or D, encoded with two such closed outline loops, for the exterior closed outline loops 11 and 15 and one for the interior closed outline loops 13 and 17 respectively, as shown in FIG. 1*b*.

As shown in FIG. 1*a*, a direction of progression of the curve outline is chosed with reference to an defined by the order of the knots around the outline. That progression of the curve locus and order of knots is shown by numeral 19 in FIG. 1*a*. The chosen order of knots defining the said progression, (i.e. $Z_{a-1}$, $Z_a$, $Z_{a+2}$ . . . $Z_{a-n}$) establishes an outline loop of knots. That outline loop may be a closed outline loop which ends upon itself, as shown in FIG. 1*b*, by closed outline loops 11, 13, 15 and 17. As will be explained below, a compiler functioning according to a parametric cubic polynomial is used to generate signals indicative of nodes which are the coordinates of locations on the locus of a smooth continuous curve between the knots. The order of the knots, defines an outline loop and the respective order of the nodes by their locations relative to the knots and to each other on the outline loop, as would be apparent to one skilled in the art. As explained below, the data representative or indicative of these knots and nodes are encoded in a data order indicative of the order of the knots and nodes on the outline loop. This data order establishes a data loop. As further explained below, the data loop may be designed to close upon itself so that the ending data location for the data loop is the starting data location where data was accessed therefrom in the encoding process and forming a closed data loop corresponding to the closed outline loop.

As stated above, the knots $Z_a$, $Z_{a+1}$, etc., may be encoded in the Cartisian coordinate system as X−Y points, using as a reference the normalized encoding grid, or may be encoded in any other system of coordinate points. The outline between the knots is not encoded initially as it will be represented by a generated series of nodes and which will represent the smooth continuous curve locus of the outline, according to the principle of the invention. The display intercept values for the nodes on the curve locus, at a predetermined display size, are related to the encoded knots on the dimensionless encoding grid shown in FIG. 1*a* by a parametric cubic polynomial relationship. Since the invention is used in a two-dimensional system, the parametric representation represents the curve locus of such nodes Z(X,Y) independently as a third order polynomial function of a parameter "t" which is independent of the encoding grid coordinates. In the preferred embodiment, the parametric cubic polynomial is shown in a Hermite form, it being understood that those skilled in the art can use other forms for defining the polynomial such as the Bezier form, defined in "Fundamentals of Interactive Computer Graphics", referred to in the foregoing, and to which the improvements of this invention are applicable.

The parametric representation of a curve is one for which X and Y are represented as a third order (cubic) polynomial relationship of a parameter "t" where:

$$x(t)=a_xt^3+b_xt^2+c_xt+d \quad 1.1$$

$$y(t)=a_yt^3+b_yt^2+c_yt+d \quad 1.2$$

The Hermite representation of the parametric cubic polynomial uses the coordinate positions, of the knots, and the tangent angles at the knots, such as $Z_a$, $Z_{a+1}$, etc. The Bezier representation uses the positions of the curve's end points and two other points to define, indirectly, the tangents at the curve's end points. The improvements of this invention shown herein are applicable to any representation by the parametric cubic polynomial which uses the position of the curve's end points and the tangent angles of the curve at the end points, directly or indirectly. For sake of explanation, only the Hermite form will be discussed.

Figure 2:
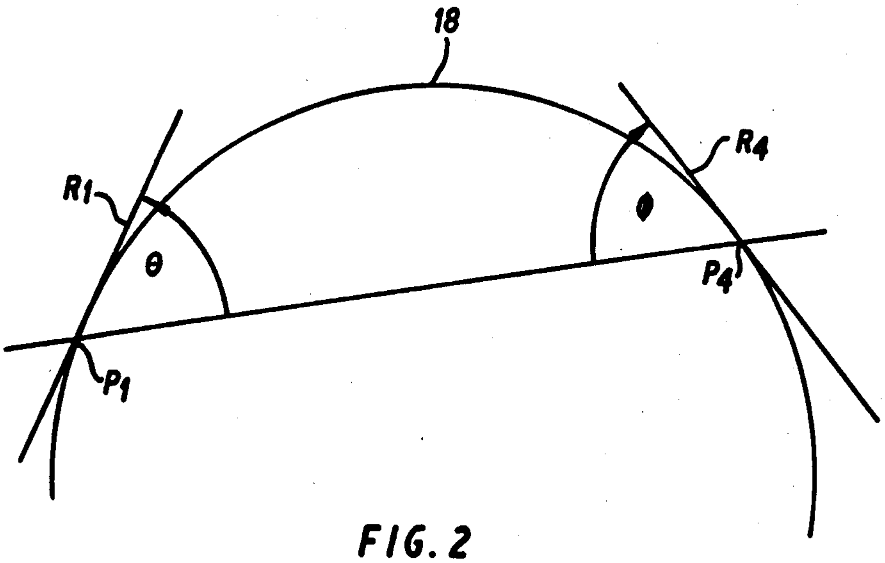
FIG. 2 shows the relationships of the knots, tangent angles and angles and to a curve, for the purpose of explaining the Hermite interpolator.

As shown in FIG. 2, given end points $P_1$, $P_4$ and the respective tangent vectors $R_1$, $R_4$ at the two end points $P_1$, $P_4$ and along the smooth continuous curve segment 18, a cubic parametric polynomial relationship between a parameter "t" and the locus of a curve segment 18, between a pair of end points, $P_1$, and $P_4$, may be represented as the following relationships below.

$$x(t)=P_{1x}+(3t^2-2t^3)(P_{4x}-P_{1x})+t(t-1)^2R_{1x}+t^2(t-1)R_{4x} \quad 2.1$$

$$y(t)=P_{1y}+(3t^2-2t^3)(P_{4y}-P_{1y})+t(t-1)^2R_{1y}+t^2(t-1)R_{4y} \quad 2.2$$

where $(P_{1x}, P_{1y})$ $(P_{4x}, P_{4y})$ are the coordinate values at $P_1$ and $P_4$ respectively, and $(R_{1x}, R_{1y})$ and $(R_{4x}, R_{4y})$ are the tangent values at $P_1$ and $P_4$ thereafter called entrance and exit angles, respectively.

Cubic curves as a minimum are used, as no lower order representation of curve segments can provide continuity of position and slope at the end points where the curve segments meet, and at the same time can assure that the ends of the curve segment pass through specific points.

The derivation of the Hermite parametric cubic polynomials are shown in "Fundamentals of Interactive Computer Graphics" and the manner of using such parametric cubic polynomials of define the points along a curve are further discussed in T<sub>E</sub>X and METAFONT referred to in the foregoing.

The Hermite form of the parametric cubic polynomial is as stated is a series of curves as shown by Knuth in Chapter 2 in TEX and METAFONT and which is written in Euler notation as $$Z(t)=Z_1+(3t^2-2t^3)(Z_2-Z_1)+rt(1-t)^2\$_1-st^2(1-t)\$_2 \quad 3.1$$

$$\$_1=e^{i\theta}(Z_2-Z_1);\ \$_2=e^{-i\phi}(Z_2-Z_1);\ 0<=t<=1 \quad 3.2$$

and, where r and s are positive real numbers. Equations 3.1, 3.2 define a curve having directions represented by the deviance angles $\theta$ and $\phi$ at $Z_1$, $Z_2$ respectively.

The relationship shown in 3.1, 3.2 may be encoded into a compiler designed to process input data related to the knot locations, the angles of the curve segment at its end points, and then for separate selected values of a parameter "t" to produce signals indicative of node locations on the locus of the curve segment. The compiler is shown at the end of the specification.

As stated above, the Hermite form of the parametric cubic polynomial is used in the preferred embodiment of the compiler but the principles of the invention can be used with any other cubic polynomical using the directions of the curve at end points of the curve and the end point locations.

Assuming a curve direction for a given knot order from knot to knot, and in particular, from knot $Z_1$ to knot $Z_2$, with knot $Z_1$ being the entrance knot for curve segment $Z_1$, $Z_2$ (hereafter curve segments will be defined by the respective segment and knots such as "curve $Z_1$, $Z_2$") and knot $Z_2$ being the exit knot for curve $Z_1$, $Z_2$, then $\theta$ is the angular direction of the curve $Z_1$, $Z_2$ at entrance knot $Z_2$, and $\phi$ is the direction of curve $Z_1$, $Z_2$ at exit knot $Z_2$. In the preferred embodiment, the interknot angle (B) made by the straight line from knot $Z_1$ and $Z_2$, is defined in terms of a reference angle given for the normalized encoding grid. Also, the angles ψ and ǥ of the curve are related to that same reference angle. Therefore, the interknot angle expressed below as B and the angles of the curve at the entrance knot, defined below as ψ and the angle of the curve at the exit knot, defined below as ǥ, are all defined with regard to a reference angle.

As further explained below, according to the inventive principles, deviance angles $\theta$ and $\phi$, shown used in equation 3.1 and 3.2, are the curve entrance and exit angles ψ, ǥ, respectively, defined with regard to the interknot angles B and applied to the compiler in the form of the parametric cubic polynomial, as shown in equation 3.1.

In explaining the invention, ψ and ǥ are used to identify the entrance angle of a curve segment at a first knot end point and the exit angle made by that same curve segment at a successive second knot end point, in the knot order. The first and second knots define the entrance and exit knots of the curve segment, with regard to the order of knots and the outline loop, as explained below. However, ψ and ǥ are defined relative to a reference angle "q" on the master encoding coordinate grid. $\theta$ and $\phi$ are the entrance angle and exit angle in the cubic parametric polynomial of 3.1 and 3.2, defined relative to an interknot angle B between the entrance and exit knots (i.e. in the preferred embodiment, $\theta$=ψ−B; $\phi$=B−ǥ). The preferred embodiment uses a process of defining the entrance angle ψ and exit angle ǥ in terms of the interknot angles on the outline loop, and with respect to a reference angle and uses the definition of the entrance and exit angles shown as $\theta$ and $\phi$ when applying the angles ψ and ǥ, at the respective entrance and exit knots, to the compiler, as based on and as required by the derivation of the cubic parametric polynomial, described herein. However, the angles $\theta$ and $\phi$ could be derived directly from the interknot angles B or precomputed from the relationship of the outline loop knots and accessed directly without first deriving ψ and ǥ and without deviating from the principles of the invention.

The parameter "t" of 3.1 is allowed to vary over a defined range as further explained below, and for each discrete selected value of t, a discrete node on the locus of the curve between the entrance and exit knots and defined by the parametric cubic polynomial is generated by the compiler. The nodes would be the coordinate location of points on the locus of the curve described by equation 3.1 for each selected value of "t" and where knots $Z_1$ and $Z_2$, and the angle of the curve at those knots, given as ψ and ǥ, derived above, was specified. The derivation of ψ, B, ǥ, $\theta$, and $\phi$ of "t" and their relationship according to the principles of the invention are further explained and shown below.

It should be noted, however, that the form of the Hermite interpolator used in the preferred embodiment imposes an opposite sign for $\phi$ than that shown in TEX and METAFONT shown in Knuth.

It should also be noted that the deviance angles $\theta$ and $\phi$ representing the divergence between the straight line angle interknot angle (B), as used in the cubic parametric polynomial of 3.1, 3.2.

"r" and "s" affect the curve velocities, as described below and the length of the curve between its respective end points (i.e., curve $Z_1$, $Z_2$ between $Z_1$, $Z_2$). "r" and "s" are velocities at $Z_1$, $Z_2$ respectively, a large velocity value meaning the curve direction changes slowly while small values indicate the curve undergoing more pronounced directional changes [small values of r and s will then have less influence on the value of x(t) or y(t)]. The velocities, r and s, in TEX and METAFONT are represented as $$4.1\quad r=\left|\frac{2*\sin\phi}{(1+|\cos\psi|)\sin\psi}\right|$$

-continued $$4.2\ s = \left| \frac{2^{*}\sin\theta}{(1 + |\cos\psi|)\sin\psi} \right|$$

$$4.3 = (\theta + \phi)/2$$

Considering the effect of r and s on the curve locus defined by the nodes, produced through the cubic polynomial relationship, the values of r and s may be limited to control the direction of the curve from the entrance knot to the exit knot. In the preferred embodiment, r and s are limited to the values of 0.1 to 4.0. However, these values of r and s could be changed without departing from the principles of the invention.

As discussed in the foregoing, the system shown therein for using the relationship of the points along the smooth curve in $T_EX$ and METAFONT have disadvantages which are eliminated by this invention which will become apparent by reading the following explanation.

As explained above, in using the parametric cubic polynomial relationship to define the nodes along a smooth curve, $T_EX$ and METAFONT start with a circle approximation rule and then must make adjustments to produce a smooth continuous curve between given points. In this invention, those disadvantages are eliminated by the invention described in the following.

In the preferred embodiment, the sign of $\phi$ is reversed relative to the angle rotation used in $T_EX$ and METAFONT.

The principles of this invention as applied to the preferred embodiment, may now be particularly seen with reference to FIG. 1*a*. As stated above, a skeletal outline is described by a progression of a series of knots in the order of $Z_a$, $Z_{a+1}$ . . . $Z_n$, $Z_{a-1}$, which defines a closed outline loop about the outline of the character or symbol. The knots are encoded as coordinate points in a closed data loop, representing the closed outline loop. As stated, the object of the invention is to produce a series of nodes representing display coordinates on the locus of a curve between each of the knots, the curve being smooth and continuous. However, as will be shown, the principles of the invention can be modified so a series of points describing straight lines between knots can be generated and smooth continuous curves can be generated between knots which are interspersed with straight lines. In addition, cusps can be formed between smooth continuous curve and/or straight lines.

The smooth continuous curve is produced through the parametric cubic polynomial relationship described above. In using the invention, the following principles are applied. The data loop may be entered at the data values representing a knot, $Z_a$ for example, and the angular relationship of the knot ($Z_a$) referenced to a preceeding knot ($Z_{a-1}$) and to a succeeding knot in the loop analyzed. The analysis may then proceed in a clockwise direction around the loop which may be considered in the forward direction. However, as stated, the analysis can proceed in a counter-clockwise or backward direction with the direction being used to denote or indicate other values, such as color, or other characteristics as may be needed. As will be understood, the directions used herein are chosen for explanation and do not limit the inventive principles.

FIG. 1*a* represents a series of knots $Z_a$, $Z_{a+1}$, $Z_{a+2}$ - - - $Z_{a+n}$, $Z_{a-1}$ arranged in a closed outline loop, encoded relative to a master encoding grid and partially defining, in skeletal form, the points on a closed outline loop, such as outline 11, 13, 15, or 17, shown in FIG. 1*b*. The interknot angles, the angles from knot to knot (i.e. from knot $Z_{a-1}$ to knot $Z_a$) are denoted generally by the letter "B" with a subscript reference indicating that the angle is formed by a straight line from a respective knot, $B_{a-1}$ for example, to a successive knot $B_a$ in the outline loop. The terms "preceding" and "successive" can be used with reference to the defined order of knots in the outline loop, i.e. either clockwise or counter-clockwise, as the case may be. In FIG. 1*a*, the knot angles B are shown as $B_a$, $B_{a+1}$, $B_{a+2}$, and so on for respective knots.

The manner of applying the cubic parametric polynomial compiler in the preferred embodiment to define nodes between the knots along the locus of a smooth curve utilizes the deviance angle $\theta$ at the curve entrance knot and the deviance angle $\phi$ at the curve exit knot. The deviance angles $\theta$ and $\phi$ may also be referred to as entrance and exit angles.

According to the principles of the invention, and assuming a smooth and continous curve segment is desired to be developed between a first knot $Z_a$ and a second knot $Z_{a+1}$, for the curve $Z_a$, $Z_{a+1}$, shown as numeral 21, in FIG. 1*c*, then the inventive principles may be used to generate a series of signals representing the display coordinates for the nodes along the locus of the smooth continuous curve 21 as follows and similarly for the curves between others of respective pairs of knots. The data encoding of the knots representing each of the closed outline loops may also be thought of as a loop, or closed data loop, indicative of and representing the physical arrangement of the knots in the closed outline loop about the character or symbol outline. As stated, the outline loop and the data loop therefore, may be thought of as an order of knots in the loop path and related to a predetermined loop direction for such order (clockwise or counter-clockwise, for example). Within that progression, and for the respective outline loop direction, it can be easily seen that each knot (i.e. $Z_a$) represents an exit point for the curve segement of the outline loop in the knot order shown by the direction of arrow 20, from a preceding loop knot (i.e. $Z_{a-1}$) and at the same time, the entrance point for the curve segment from that knot (i.e. $Z_a$) to a successive knot (i.e. $Z_{a+1}$). The nodes, generated as explained below are given an order in the outline loop related to the order of knots on the outline loop and the encoding for the nodes is similarly arranged on the data loop in the order of the knots.

In explaining the invention, the convention used for identifying a curve part of the outline loop between knots is to refer to it by its knot end points, (i.e. curve part 21 is curve $Z_a$, $Z_{a+1}$). Similarly, a convention is used to identify a curve entrance and exit angle as explained below.

The entrance angle a for curve $Z_a$, $Z_{a+1}$ (between knots $Z_a$ and $Z_{a+1}$), according to our convention, would be the angle represented by the first derivative of the curve $Z_a$, $Z_{a+1}$ at knot $Z_a$ and the exit angle g would be the angle represented by the first derivative of the curve segment at the next successive knot $Z_{a+1}$.

As would be understood, where a smooth continuous curve is desired to pass through a knot, (i.e. Za) then the entrance angle a, at a knot would be the same as the exit angle g at the same knot for the preceding curve segment $Z_{a-1}$, $Z_a$.

In explaining the principles of the invention, the entrance angles a and exit angles g for curve segments starting and ending at knots are defined for the respective knots according to the following convention. The curve segments may be thought of as having an entrance angle a at the knot where the outline loop, in the defined progressive order of knots, enters a respective curve segment (i.e. curve $Z_a$, $Z_{a+1}$) forming an entrance angle $a_a$ at that entering knot, and an exit angle $g$ at the next successive knot in the loop where the loop exits curve segment $Z_a$, $Z_{a+1}$ forming exit angle $g_a$ at knot $Z_{a+1}$. In the convention chosen, the entrance and exit angles ($a_a$, $g_a$) for a curve segment ($Z_a$, $Z_{a+1}$) of the loop are referenced to the entrance knot ($Z_a$). The entrance angle, $a_a$, and the exit angle $g_a$, therefore have a subscript reference to the entrance knot $Z_a$, but refer to the curve segment of the loop and the angle that curve segment makes at a first knot Za where the loop enters the curve $Z_a$, $Z_{a+1}$ and the angle at a successive knot ($Z_{a+1}$) relative to the outline loop direction where it exits the curve $Z_a$, $Z_{a+1}$. The entrance angle, $a_a$, is then the angle the loop makes as it passes through knot $Z_a$, enters curve $Z_a$, $Z_{a+1}$, and continues on to knot $Z_{a+1}$. The exit angle $g_a$, is the angle the loop makes as it passes through knot $Z_{a+1}$, exits curve $Z_a$, $Z_{a+1}$, enters the next successive curve $Z_{a+1}$, $Z_{a+1}$ and continues on to the next subsequent exit knot, $Z_{a+2}$. In summary, the entrance angle, a, and exit angle, g, according to the convention chosen to explain the principles of this invention, refer to a curve segment of a loop outline between two knots such as $Z_a$ and $Z_{a+1}$, the entrance angle $a_a$ being the tangent angle or first derivative the outline loop makes as it enters curve $Z_a$, $Z_{a+1}$ at preceding knot end point $Z_a$ in the outline loop direction, and the exit angle, $g_a$, the tangent or first derivative of the outline loop it makes as it exits that curve $Z_a$, $Z_{a+1}$ at knot end point $Z_{a+1}$ and enters the next successive curve $Z_{a+1}$ $Z_{a+2}$, in the outline loop direction. As can be seen, the exit angle, $g_a$, for the curve $Z_a$, $Z_{a+1}$ is the same angle as the entrance angle $a_{a+1}$, for the next successive curve $Z_{a+1}$, $Z_{a+2}$, in the outline loop direction. Similarly, the entrance angle, $a_a$ is the exit angle, $g_{a-1}$ for the preceeding curve $Z_{a-1}$, $Z_a$. It will be understood by those skilled in the art that these conventions can be changed without changing the principles of the invention.

Whereas Knuth uses the rule that a smooth continuous curve locus between points, such as from $Z_{a-1}$ to $Z_a$ to $Z_{a+1}$, must take the direction of a circle, the invention herein avoids that rule and the problems created thereby by using an average of the interknot angles (B) relative to a knot to define the respective knot entrance and exit angles, a and g respectively, and thereby $\theta$ and $\phi$ respectively.

Figure 1C:
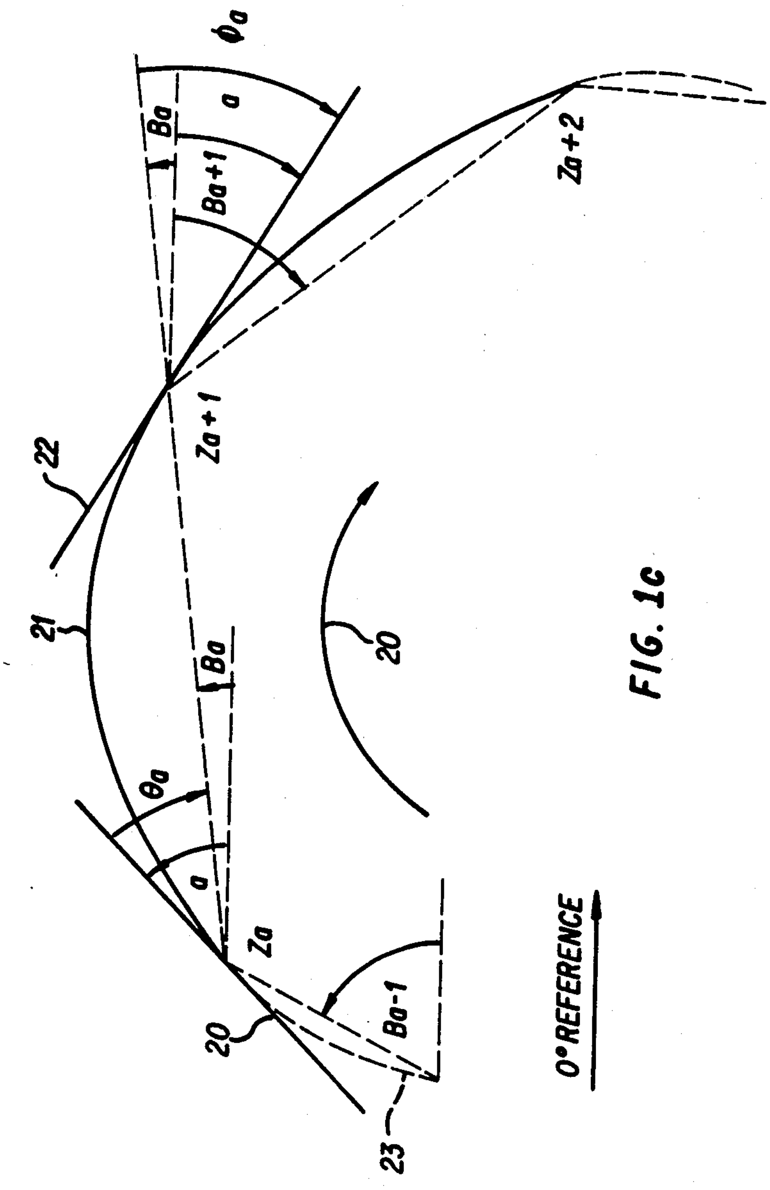
FIG. 1*c* shows the curve segments $Z_{a-1}$, $Z_a$, $Z_a$, $Z_{a+1}$, and curve $Z_{a+1}$, $Z_{a+2}$ and the relationships of the deviance angles $\theta$ and $\phi$, at knot $Z_a$ and $Z_{a+1}$.

For example, in FIG. 1c, for the curve $Z_a$, $Z_{a+1}$, shown as numeral 21, the entrance angle $a_a$ at knot Za of the curve $Z_a$, $Z_{a+1}$, for example, is related to the average of the interknot angles $B_{a-1}$ (from the preceeding knot $Z_{a-1}$ to knot $Z_a$) and $B_a$ (from $Z_a$ to the succeeding knot $Z_{a+1}$). That average angle of the outline loop at any knot Z is a; so expressed as a when referring to the entrance angle at a knot and into a curve segment and g when referring to the exit angle from a knot and out of a curve segment. In the case of knot $Z_a$, the average entrance angle would be $a_a$ for the curve $Z_a$, $Z_{a+1}$ (shown by numeral 21), proceeding from $Z_a$ to $Z_{a+1}$ in the order shown by arrow 20 and $g_{a-1}$ for the average exit angle for the curve $Z_{a-1}$, $Z_a$ (shown by numeral 23), proceeding from $Z_{a-1}$ to $Z_a$ in the order shown by arrow 20.

The angles a or g are always referred to as entrance and exit angles respectively herein, but may or may not be average angles or not depending on the application of each, as explained herein.

The invention is explained with reference to the example of curve $Z_a$, $Z_{a+1}$, wherein $Z_a$ is the entrance knot and $Z_{a+1}$ is the exit knot, it being understood that the same analysis would apply to other curve segments either adjoining or further remote from curve $Z_a$, $Z_{a+1}$ and having respective entrance and exit knots.

In using the compiler to generate the nodes along a smooth continuous curve, the encoded data loop representing the knots along the closed outline loop may be entered at any set of data representing any knot Z, for example, designated to be the entrance knot and the average angle determined by proceeding in the chosen loop direction using the interangular relationships of a knot to its related knots in the loop, to determine the average angles a and g at such related knots. In the preferred embodiment, these related knots are adjacent knots to the next successive knot to the entrance knot.

In the preferred embodiment, the invention principles of generating the nodes on the smooth continuous curve locus, starts with a first average angle, determined for the knot coordinate successive to the data loop entrance knot, and which is represented by the data residing at the location in the closed data loop where that data loop was entered. The interknot angle for the entrance knot is then saved and used at the completion of the loop analysis to determine the average entrance and exit angles at that entrance knot when the outline loop analysis reaches that entrance knot in the closed outline loop knot. Where the data loop entrance knot is $Z_{a-1}$, its average angle would be determined using the preceding interknot angles $B_{a-2}$ and $B_{a-1}$ for related knots $Z_{a-1}$ and $Z_{a-2}$.

Following the above, the average angle $a_a$ and exit angle $g_{a-1}$ at knot $Z_a$ is the average of $B_{a-1}$ and $B_a$ and expressed as $$a = B_{a-12} + B_a = g_{a-1}$$

The average exit angle $g_a$ and entrance angle $a_{a+1}$ at knot $Z_{a+1}$ is the average of $B_a$ and $B_{a+1}$ and expressed as $$g_a = B_{a+12} + B_a = a_{a+1}$$

As shown, the average entrance angle a for any curve segment is the average of the interknot angles at the respective curve segment knot and at related knots, (i.e. the preceding knot in the outline loop) and the average exit angle g is the average of the interknot angles at the respective curve segment exit knot and at related knots (i.e. the next successive knot in the outline loop), as shown above.

The parametric cubic polynomial compiler may then be employed to relate the entrance and exit angles a, g for the respective entrance and exit knots to a series of nodes describing the locus of a smooth curve between the respective entrance and exit knots (i.e. $Z_a$, $Z_{a+1}$). For the example above, the knots are $Z_a$, $Z_{a+1}$ and the respective entrance and exit angles are $a_a$ and $g_a$ for curve $Z_a$, $Z_{a+1}$.

The curve velocities r and s are related to the deviance angles $\theta$ and $\phi$, as set forth above and as used in equation 4.1, 4.2, 4.3. As stated in the foregoing, $\theta$ is the deviance between the average entrance angle, for example, $\bar{\theta}_a$ for curve $Z_a$, $Z_{a+1}$, at an entrance knot $Z_a$ and the interknot angle $B_a$ at that entrance knot $Z_a$. Similarly, $\phi$ is the deviance between the average exit angle, for example, at the exit knot, $Z_{a+1}$, for the curve $Z_a$, $Z_{a+1}$ and the interknot angle $B_a$ at the entrance knot Za.

Figure 1D:
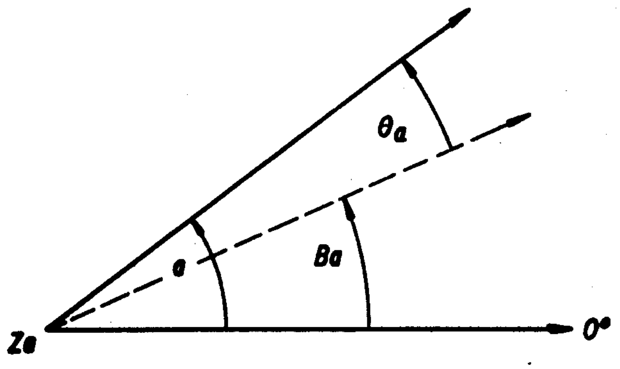
Figure 1E:
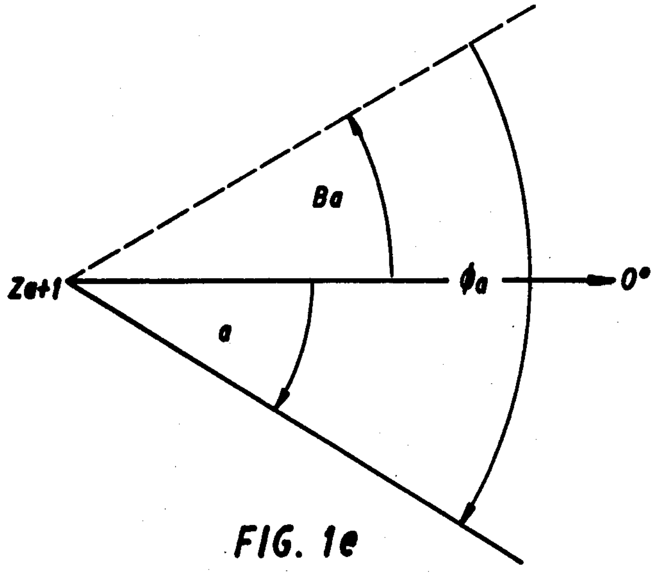

The relationships between $\bar{\theta}_a$, $B_a$, $\bar{\phi}_a$, $\theta_a$ and $\phi_a$ may be more clearly seen in FIGS. 1*d* and 1*e* for knots $Z_a$ and $Z_{a+1}$ respectively.

As a reminder, it should be remembered that the angles, $\theta$ and $\phi$ are the tangents to the locus of the curve represented by the nodes generated using the cubic parametric polynomial compiler with respect to the respective interknot angles.

Figure 3:
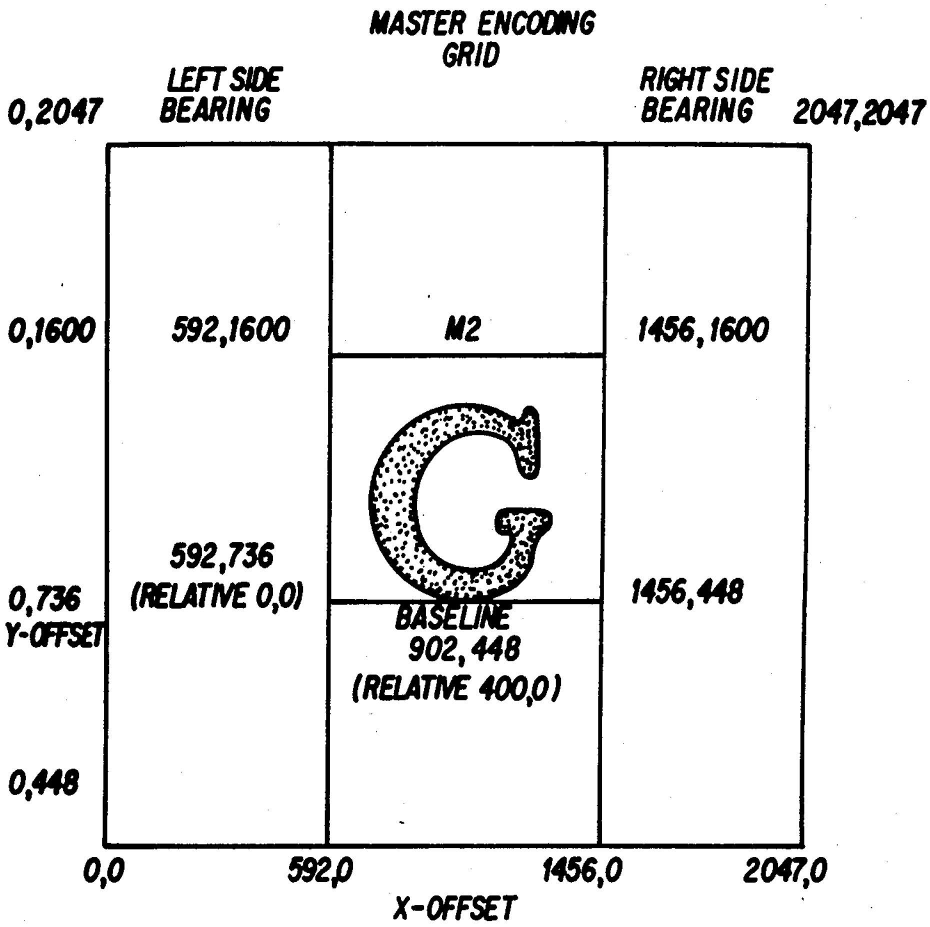
FIG. 3 shows a master encoding grid as may be used in the preferred embodiment, at a normalized size, for encoding a character or symbol such as the character G shown in FIG. 3, as a master encoded character, at a normalized size.

The coordinate values of $Z_a$, $Z_{a+1}$, used through the parametric cubic polynomial compiler to generate the node values are the scaled intercept values given in RRU's, derived from the master encoded values of the knots, in DRUs. For example, assuming an encoding grid shown as an $M^2$ in FIG. 3 and defined as 864×864 DRU's between master encoding grid (x,y) coordinates 592, 736; 592, 1600; 1456, 1600 and 1456, 448 (wherein x,y points 592, 736 are defined as relative ∅,∅, relative to an x, y offset of 592, 736 respectively) and wherein the encoding grid is defined as 2047 by 2047 DRU's.

In the preferred embodiment, the universe of the master encoding grid comprising the $M^2$ is 32768×32768 DRU's and the offset which positions the origin of the $M^2$ can be positioned anywhere in that universe. In the preferred embodiment, the x and y offsets and shown in FIG. 3.

The x,y coordinates of the intercept locations for knots $Z_a$ at the displayed size in RRU's may be derived prior to generating the nodes by scaling, using the following conversion factor (CF), for the preferred embodiment.

Where:

"P" in the desired display size in points per $M^2$ ($Pt/M^2$),

"Res" is the ratio of micrometers per point (uM/Pt) and serves to convert the display size from points to metric units;

"RRU/MM" is the display resolution in Raster Resolution Units per Micrometer;

$M^2$/DRU is the inverse of the encoding grid resolution, in DRUs per $M^2$; and $$(P)*(Res)*(RRU/MM)*(M^2/DRU)=(CF)*(RRU/DRU)$$

For Master Coordinate $Z_n(X_n, Y_n)$, $$(X_n\ DRUs)(CF_x RRUs/DRU)=X_n RRUs,$$

and $$(Y_n DRUs)(CF_y RRUs/DRU)=Y_n RRUs$$

The value of the parameter t may be derived from the respective curve segment interknot distance $Z_d=|Z_{n+1}-Z_n|$ given after scaling in RRUs, as described below. The generated coordinates for the nodes are expressed in RRU's permitting run length encoding of the display outline coordinates. Where $Z_d$ is a non-integer, the fractional value may be discarded or rounded with redundant values eliminated.

In the preferred embodiment of this invention, the incremental value of t is related to the inverted value of the absolute difference $Z_d$ between the entrance and the exit knots, i.e.

$$t\_inc=1/Z_d=1/|Z_{n+1}-Z_n|.$$

Zn may be easily derived from the axial difference in the X direction, [i.e. $Z_d=[(X_{n+1}-X_n)/\text{Cosine}(B_n)]$, or the axial difference in the Y direction, $[Z_d=[(Y_{n+1}-Y_n)/\text{Sine}(B_n)]$; Where $X_nY_{n+1}$; $X_{n+1}$, $Y_{n+1}$ are successive knots defining end points for a curve segment of the closed outline loop and Bn is the interknot angle there between].

In practice, it is better to use the larger axial value in the X or Y direction, to minimize error. In implementing the invention, the preferred embodiment limits increments of t to 1/1024. Discrete values of $T_1=3t^2-2t^3$, $T_2=t^2(1-t)$ and $T_3=t(1-t)^2$ (see equation 3.1, 3.2) may be stored in a look-up table for 1024 values of t in the range 1/1024 t 1024/1024.

In practice t is stored in the range of 1023/1024 because the knot end point coordinate corresponding to t=1024/1024 or 1 is saved, avoiding the need to calculate that knot end point and providing a more reliable result.

Figure 4:
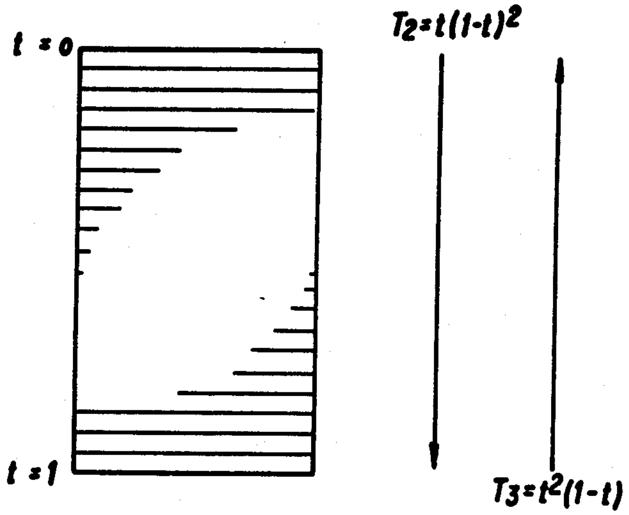
FIG. 4 shows the manner a look-up table may be arranged so access in one direction would provide a value equal to $T_2$, as explained herein, and in the opposite direction, a value of $T_3$, as explained herein.

Further, because of the relationship of $T_1$, $T_2$ and $T_3$, a look-up table as shown in FIG. 4, having values of $T_2$ starting with t=0 and ending with a value of $T_2$ for t=1, may be accessed in reverse order for values of $T_3$, as shown in FIG. 4.

The values, shown stored in a look-up table in FIG. 4, are for discrete values of t in discrete steps of 1/1024 (i.e. 0/1024 to 1023/1024). However, t is shown being inclusive from 0 to 1 for the purpose of explanation, it being understood that in the preferred embodiment, varies between 0 and 1023/1024 as the end point for $T_2$ 1024/1024 is known.

Because the functions domain of the variable t for the solution sets $T_2=t(1-t)^2$ and $T_3=t^2(1-t)$ overlap, a table of values may be accessed in one data direction with respect to a first domain of variables for which the value represents a solution set. Similarly, that solution set may be accessed in an opposite data direction for a second domain of a variable.

Also, because the function $|1+\text{Cos}\,\Psi|\ \text{Sin}\,\Psi$ is symmetric about 45 degrees, it is only necessary to store values thereof for 0 to 45 degrees in half angle steps.

The solution set of values for the functions $T_2$ and $T_3$ may be accessed in a first data direction to provide the functional solution set values for the domain t=∅ to t=1 and in reverse order for the domain t=1 to t=∅. Values of Sine may be stored in half angle steps between ∅ and 9∅ degrees. Further, any derived nodes may be stored and used again where the respective curve or corresponding symbol outline loop is to be duplicated.

By forming a cumulative value of t as a multiple of the incremental value of t and applying cumulative discrete selected values of t within the parametric cubic polynomial compiler, according to equation 3.1, display intercepts represented by the generated nodes are produced which may then be used as the display coordinates for the closed loop outline at the desired display size.

As stated above, the value of $\theta$ and $\phi$ used in the compiler are derived, according to the principles of the invention from the average entrance and exit angles, $\bar{\theta}$ and $\bar{\phi}$ at a respective set of entrance and exit knots. The nodes which are generated using the incremental value of t to increment the cumulative value of t and by applying discrete selected cumulative incremented t values to the cubic parametric polynomial compiler to produce respective node coordinates for such discrete selected values of t.

The nodes, represent locations on the curve, which, as stated above, form an angle at the entrance knot of the curve as given by $\theta$, and forms an angle at the exit knot given by $\phi$ As stated, an order is chosen for the knots and the order of knots defines an outline loop of knots, the nodes being locations on the curve, between the knots also have an order defined by that knot order and by the defined outline loop. As would be understood by those skilled in the art, that order is the succession of knots and nodes encountered as one progresses along the outline loop as specified. The data for the knots and nodes, as stated above, is encoded in a data loop in that same order of knots and nodes. The encoded knots and nodes are placed in the data loop, in that order corresponding to the outline loop. Then, as one progresses in the defined order along the data loop, corresponding to the outline loop, one would encounter the encoding for the knots and nodes in the data loop in an order, corresponding to the order one would encounter the respective knots and nodes on the outline loop represented by that said encoding.

In summary, given the knot locations, and the angles of the curve at an entrance and exit knot as defined above, and given an incremental value of t, then each discrete selected cumulative value of t, as described above, applied to the cubic polynomial parametric compiler would produce respective nodes, indicative of locations along the smooth continuous curve described by the cubic parametric polynomial. The encoding for the knots and nodes would be in the same order along a data loop as one would encounter the corresponding knots and nodes along the outline loop, when proceeding in a chosen order along the outline loop.

The outline loop, when closing upon itself as shown in FIG. 1*b*, for example, is called a closed outline loop. The data when encoded in a data loop which closes upon itself corresponding to the closed outline loop is called a closed data loop. In this way, accessing the closed data loop, in a direction corresponding to the chosen direction along the closed outline loop will return one to the initial or starting data loop entrance location. As described below, the data loop decoding is not complete until a determination is made that the accessed location for the closed data loop is starting location point and that accessing of all the encoded data in the closed loop has been completed.

Of course, as one skilled in the art would realize, variations of the above closed outline loop and closed data loop can be made without departing from the principles of the invention.

These node coordinate values given in Raster Units may then be used in run length or other suitable data forms to modulate a display to produce the curve at the desired size, as is well known.

The compiler according to the foregoing is shown below.

ENCODING

The novel manner of encoding the data pack, according to the principles of the invention, is shown in the Table I below, wherein p is the value of dx, q is the value of dy and 0, 1, 2, . . . D, E, F, are bit positions in the encoded data pack. In the preferred embodiment, the bit positions are valued according to the binary number system. The Control Codes, explained below, are shown in Table II. The encoding, shown for a maximum 12 binary words of 3 nibbles, in the preferred embodiment, is used to define a control code or coordinate position for the master encoding grid. It should be understood that the size of the word and the number of nibbles used, as described below would increase to accommodate a larger universe, commensurate with a larger size master encoding grid.

The binary words are encoded in a series of nibble length data words, arranged in the order of the data loop. In this way, as will be shown below, the values of selected data words with a nibble series may be used to define the number of nibbles in a complete information set and the initial nibble or bit positions in the next successive complete information set.

A complete information set (CIS) would be the set of data words necessary to completely define the next coordinate or a control code, as shown below.

TABLE I

| Case Indicated by a 1st nibble value of | F | E | D | C | B | A | 9 | 8 | 7 | 6 | 5 | 4 | 3 | 2 | 1 | 0 | Case | Limits | |
|---|---|---|---|---|---|---|---|---|---|---|---|---|---|---|---|---|---|---|---|
| 1-3 | | | | | | | | | | | | | 0 | 0 | q1 | q0 | .I.a | p = 0 | q = [1 . . . 3] |
| 0 | | | | | | | | | q3 | q2 | q1 | q0 | 0 | 0 | 0 | 0 | .I.b | p = 0 | q = [0,4 . . . 18] |
| 4-7 | | | | | | | | | q2 | p2 | p1 | p0 | 0 | 1 | q1 | q0 | .II. | p = [1 . . . 8] | q = [1 . . . 8] |
| 8-B | | | | | q3 | q2 | q1 | q0 | p3 | p2 | p1 | p0 | 1 | 0 | q4 | p4 | .III. | p = [1 . . . 32] | q = [1 . . . 32] |
| C-F | p6 | q6 | q5 | q4 | q3 | q2 | q1 | q0 | p3 | p2 | p1 | p0 | 1 | 1 | p5 | p4 | .IV. | p = [1 . . . 128] | q = [1 . . . 128] |

TABLE II

| Case | Definition | Override Control Code Value | Total No. of Data Words Needed incl. 1st Data Word | Purpose |
|---|---|---|---|---|
| Ib | end last | 0 | 2 | end of last loop |
| Ia | horizontal(x) | 1 | 1 + 3 = 4 | horizontal motion |
| Ia | vertical(y) | 2 | 1 + 3 = 4 | vertical motion |
| Ia | diagonal(x,y) | 3 | 1 + 3 + 3 = 7 | diagonal motion |
| Ic | start loop | 4 | 2 | end/start new loop |
| Ib | x negate | 5 | 2 | invert x direction |
| Ib | y negate | 6 | 2 | invert y direction |
| Ib | xy negate | 7 | 2 | invert x & y direction |
| Ib | line sharp | 8 | 2 | linear interpolate sharp knot |
| Ib | line smooth | 9 | 2 | linear interpolate smooth knot |
| Ib | sharp | 10 | 2 | curve interpolate sharp knot |

TABLE II-continued

| Case | Definition | Override Control Code Value | Total No. of Data Words Needed incl. 1st Data Word | Purpose |
|---|---|---|---|---|
| Ib | smooth | 11 | 2 | curve interpolate smooth knot |

The data pack forming the closed loop is used for encoding the axial distances in DRUs (p=dx, q=dy) between knots, and for the double purpose of identifying and accessing override control codes. These override control codes are used to speed the decoding process and reduce the requirement for encoded data describing coordinate points while offering the further option of edit commands.

The data pack override control codes may be used to override machine default command codes which would otherwise be responsive to parameters expressed within the data pack. As can be seen, the data pack offers the option of following default command codes, response to predetermined parameters, such as angles between knots or interknot distances, or override control codes for generating the desired series of nodes and curve locus between knots.

In the preferred embodiment, the default command codes are selected responsive to the parameters of the closed outline loop described by the interknot distances expressed within the data pack. The process of the invention described above for generating a series of nodes forming a smooth continuous curve between a set of end points would normally be used except where the distance between those end points was greater than a predetermined distance, such as 128 units for the preferred embodiment. In that case, where the interknot coordinate distances were greater than 128 units, the default command code responsive thereto would direct straight line interpolation and the formation of a series of nodes to find the locus of that straight line between the knots defining that respective coordinate distance.

Similarly, where the exterior angle formed by a line from the entrance knot to the exit knot and by a line formed from the exit knot to a successive knot is greater than a predetermined angle, such as 40° in the preferred embodiment, then a default command code responsive thereto would direct that a cusp be formed at the exit knot.

Straight line interpolation is well-known in the art. However, within the inventive scheme herein is provided an auto-scaling interpolation which provides an innovative and simpler method of linear interpolation and at the same time increases its accuracy and the precision of the closed outline loop as defined by the series of generated nodes. The auto-scaling linear interpolator is described below.

The format of the data pack shown in Table 1 is based 4 bit boundries defining data words of 4 bits each. Data from the data pack, representing discrete complete information sets is accessed in a series of data words in nibbles of 4 bits at a time with the significance of that complete information set (CIS) and the number of data words therein indicated by the value of the first nibble. The correspondence between the first data word value of a series of data words forming a CIS and the Case indicated by that first data word value is shown below.

| First data word value | Case | Purpose |
|---|---|---|
| 1-3 | Ia | Control Code |
| 0 | Ib | Control Code |
| 4-7 | II | Coordinate Distance |
| 8-B | III | Coordinate Distance |
| C-F | IV | Coordinate Distance |

A series of data words may be a control code as in the Cases Ia and Ib or the coordinate distances between knots, represented by the x,y incremental values between such knots in the preferred embodiment, in Cases II, III and IV.

Where the data words are nibbles, in the preferred embodiment the first nibble value of a nibble series then indicates the Case, and directs the access of a predetermined number of successive nibbles or data words within the closed data loop from the CIS and to complete the override control code, as in Case Ia or Ib or to assemble the number of data words necessary to complete the values corresponding to the coordinate distance between the next knot in the closed outline loop, as in Cases II, III and IV.

The number of nibbles or data words accessed responsive to the first nibble or data word value are the nibble or data word series necessary to form the CIS for the particular Case, after the first nibble or data word, as follows:

In Case II, one nibble or a total of 2 nibbles are required. In Case III, two more nibbles after the first nibble, or a total of 3 nibbles are required, and in Case IV, three more nibbles after the first nibble, or a total of 4 nibbles are required to provide the value of the interknot coordinate distance.

In the Cases Ia and Ib, the number of successive nibbles which must be accessed, responsive to the value of the first nibble, is ordered responsively to the Case indicated and as explained in detail below. For example, Case I may require the accessing of 3 or 6 nibbles to complete the Case Ia control code.

At the end of the data word series of a CIS, accessed responsive to the first data word value, the next successive nibble in the closed data loop would then be considered the first data word value of the next data word series and corresponding CIS. That new first data word value of the next data word series would then in a similar manner indicate the number of successive data words to be accessed to complete the completed information set for the override control code or the value of the interknot coordinate distance, as the case may be. By encoding the closed data loop on 4 bit boundries, the data with respect to control codes may be packed successively within the closed data loop with the data respecting the interknot coordinate distances and, as such, the closed data loop may serve the double function of providing override control codes as well as interknot distance data.

Table II provides a definition of the control codes, control code value, the number of nibbles including the first nibble to complete the control code instruction and the purpose of the control code.

Further, as shown in Table I, and as stated above, a first nibble value of 1 to 3 is indicative of Case Ia and with that first nibble value indicating the particular control code value for case Ia, either 1, 2, or 3, and the number of subsequent nibbles to be accessed for the CIS forming that particular Case Ia control code.

As shown in Table II, 3 additional nibbles are required for a total of 4 nibbles, including the first nibble, to complete the CIS responsible to a control code value 1, 3 additional nibbles for a total of 4 nibbles are needed to complete the CIS responsive to a control code value of 2 and 6 additional nibbles for a total of 7 nibbles are needed to complete the CIS responsive to a control code value of 3.

Where the first nibble value of a CIS is zero, then Case Ib is indicated, as shown in the Table I, and the access of the next successive nibble directed for completion of the Case Ib instruction. In Case Ib, 4 is added to that next nibble value to obtain the control code value for case Ib. The control code values for Case Ib are shown in table II with their corresponding purposes.

In summary, a first nibble value of 0, or 1 to 3, indicates Case Ia or Case Ib as shown above, and directs the accessing of a predetermined number of nibbles in the closed data loop successive to the first nibble, to form the CIS for that Case and which is then used to determine the control code value which in turn directs the processor. The next nibble subsequent in the order of the closed data loop to the last nibble of the previous nibble series corresponding to a CIS then becomes a new first nibble value and is used to indicate either an override control code or interknot coordinate distance. Further, and as shown below, where the first nibble bit as shown above indicates a Case II, the ordering of one more nibble for a total of 2 nibbles is required to complete the CIS and to provide the incremental coordinate distance. For Case III, 2 more nibbles for a total of 3 nibbles are required to complete the CIS for the incremental coordinate distance. For Case IV, 3 more nibbles for a total of 4 nibbles are required to complete the CIS for the incremental coordinate distance for code 4. Then the next successive nibble in the closed data loop after the CIS would be the new first nibble value indicative of case Ia, Ib, II, III, or IV, as the case may be, leading to an indication of the number of successive nibbles needed to complete the CIS to complete the control code or incremental coordinate distance.

For the override control code Case Ia, where the next successive knot in the closed outline loop is to be defined by Case Ia, control code values 1, 2 or 3, as shown in Table II, then, the first nibble value will have a value of 1, 2 or 3 (thereby indicating override control code Case Ia), and with the control code value being indiated by the specified first nibble value (i.e. 1, 2, or 3). The number of successive nibbles to be accessed to form the CIS for that Case Ia control code are indicated by the value of the first nibble value. Where the value of that first nibble value is 1, then as shown in Table II, the next three nibbles in the closed data loop are accessed and used to denote horizontal or motion in the X direction with the next knot X coordinate given by the next three nibbles, completing the nibble series necessary to form the Completed Information Set for that control code.

Where the value of that 1st nibble is 2, then as shown in table II, a vertical motion in the Y direction is indicated with the next three nibbles in the closed data loop being accessed, to complete the nibble series necessary to form the CIS and indicating the Y coordinate value of the next knot.

Where the value of that 1st nibble is 3, then the next six nibbles in the closed data loop are accessed to complete the nibble series and necessary to form the CIS and indicating the next knot, diagonally related to the immediate knot, and with the X,Y coordinates therefore given in each of the next 3 nibbles.

In the preferred embodiment, the least significant bit of the control codes for Case Ia, namely control codes 1, 2, and 3 is used to provide a direction instruction for new X,Y or X,Y coordinate values relative to the preceding knot in the closed outline loop. That relative direction between the new knot position and the preceding knot is then followed when locating the positions of successive knots corresponding to the information in a Case II, III or III instruction indicating the incremental coordinate distance. As will be seen below, the direction may also be changed by a Case Ib control code 5, 6 or 7 which would negate the established X, Y or XY direction.

In summary, in the closed outline loop new knot coordinates as indicated by Case Ia, control code values 1, 2 or 3, shown in table II, would be located in a direction consistent with a previous X and Y direction instruction, unless the least significant bit of the first nibble value for the CIS indicates a change in direction, as in Case Ib, control code values 5, 6 and 7.

In summary, the first data word value is the value of the first data word of a series of data words forming the Completed Information Set (CIS) of the closed data loop, indicating a override control, code as in case Ia, for first nibble values 1, 2 and 3, or as in Case Ib, for value 0, or the incremental coordinate distances as for first nibble values 4-F, for cases II, III or IV.

Then, as stated above, if the 1st data word value, in a nibble size data word series is a zero, then control code case Ib is denoted. Case Ib, directs the access of another nibble of 4 bits in the closed data loop and, if that nibble is not equal to 0, its value is added to value 3 to obtain the proper control code, as shown in Table II. In this way, a total value of control codes 0 and 4 to 18 may be defined. The meanings of each of the control codes having values 4–11 is shown in Table II.

If the control code value for the additional 4 bits is zero, the end of the last loop is indicated (i.e. bits 4–7 are 0 value).

Code 4 indicates the start of a loop.

Codes 5, 6 and 7 provide direction information for the next knot in the closed outline loop relative to the preceding knot.

Codes 8, 9, 1ϕ and 11 are editing override control codes, which override the default command codes.

The editing override control codes are used to override the default command codes, which would normally be responsive to and result from a machine interpretation of the data pack values for cases II, III and IV.

Figure 5:
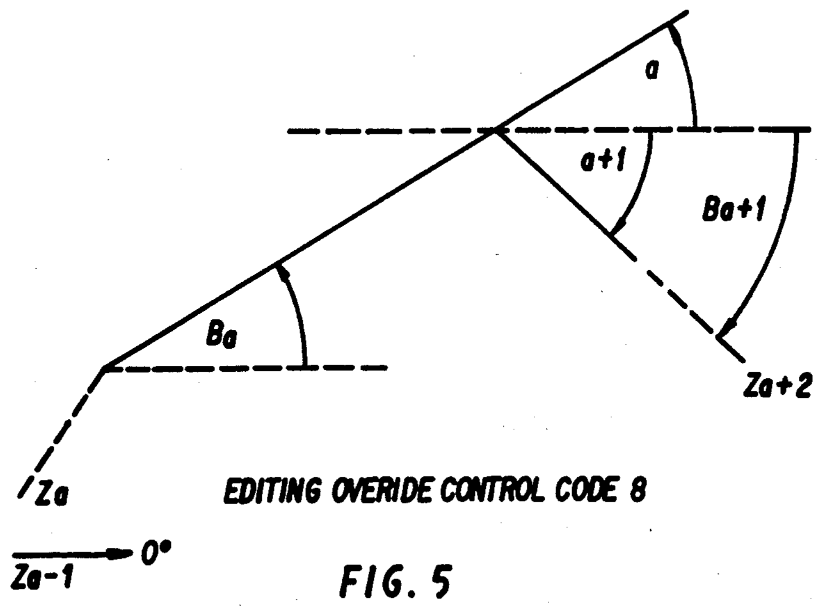
FIG. 5 shows the angular relationships between a set of knots $Z_a$, and $Z_{a+1}$ when a sharp knot or cusp is to be produced.

Code 8 directs Linear Interpolation Sharp Knot. As shown in FIG. 5, it may be used to force the exit angle at a knot (i.e. $\phi_a$ at knot $Z_{a+1}$) for curve $Z_a$, $Z_{a+1}$, to be equal to the interknot angle $B_a$ at the entrance knot, $Z_a$ of that same curve $Z_a$, $Z_{a+1}$. As shown in FIG. 5, Code 8 forces the curve $Z_a$, $Z_{a+1}$, at knot $Z_{a+1}$ to have the same exit angle at the exit knot ($Z_{a+1}$) as the interknot angle $B_a$ at its entrance knot $Z_a$ and produces a sharp cusp at $Z_{a+1}$. To complete the cusp at $Z_{a+1}$, the entrance angle $ɬ_{a+1}$ for curve $Z_{a+1}$, $Z_{a+2}$ would be forced equal to the interknot angle $B_{a+1}$ at $Z_{a+1}$.

Code 9 denotes Linear Interpolation-Smooth Knot and may be used, for example, to force a smooth knot located at the end of a curve $Z_a$, $Z_{a+1}$ which then becomes a straight line, or at the end of a straight line, which then becomes a smooth continuous curve.

Figure 6A:
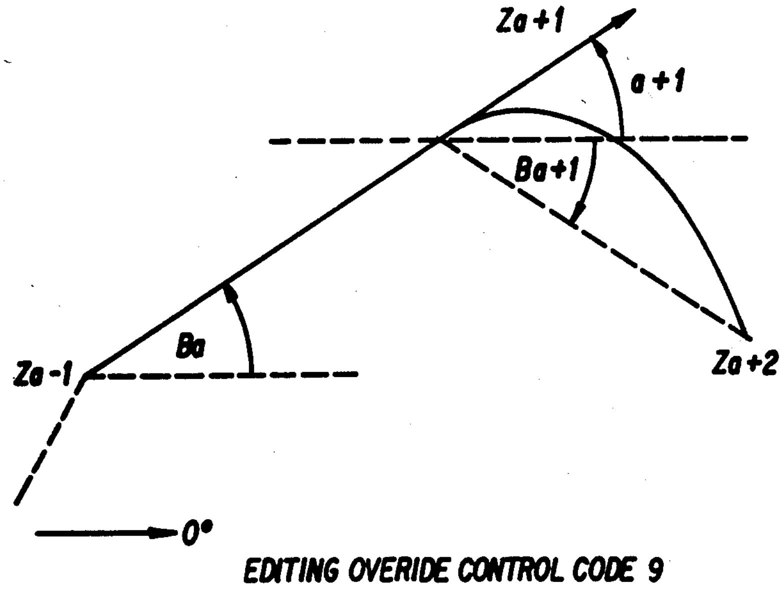
FIG. 6*a* shows the angular relationships at a set of knots when a knot between a straight line and a curve is desired to be smooth.
Figure 6B:
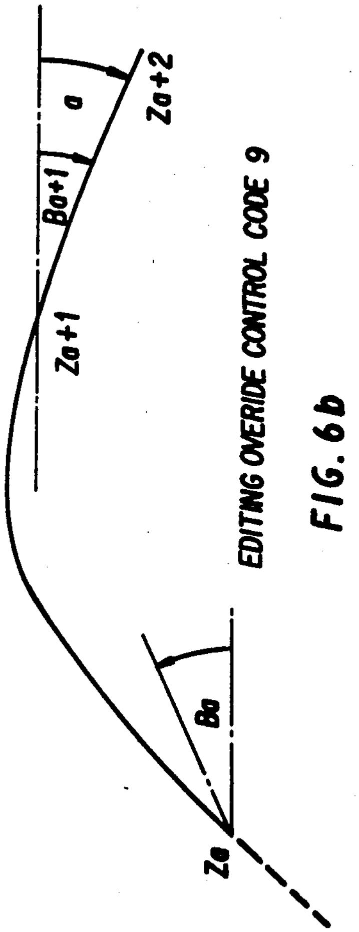
FIG. 6*b* shows the angular relationships at a smooth knot, and between a curve line and a straight line.
Figure 7A:
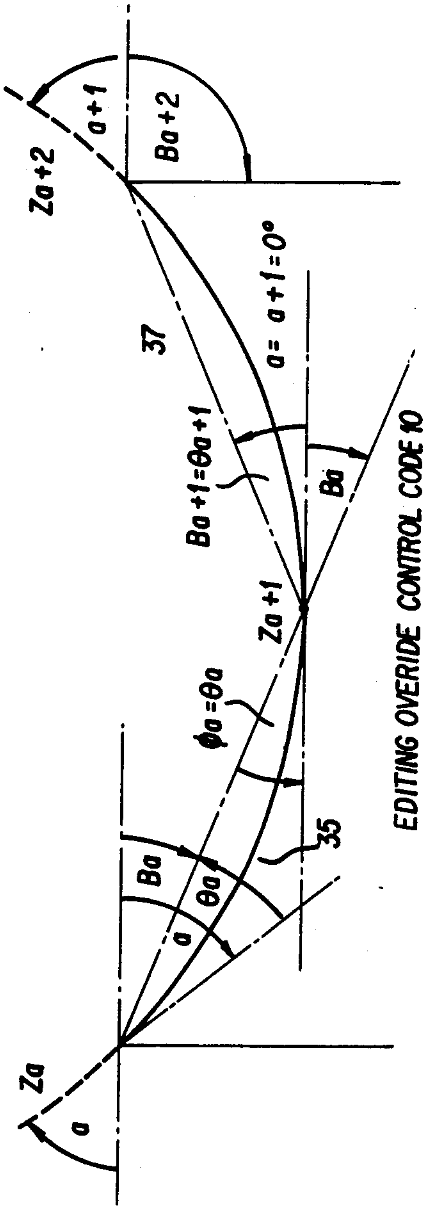
FIG. 7*a* shows angular relationships at a knot between a curve line and straight line, forced by a control code to override a default command code, which otherwise would produce the results shown in FIG. 7*b*.
Figure 7B:
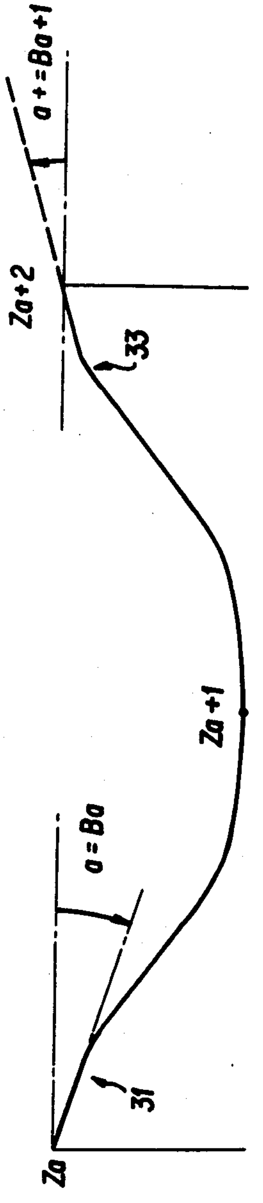
Figure 8:
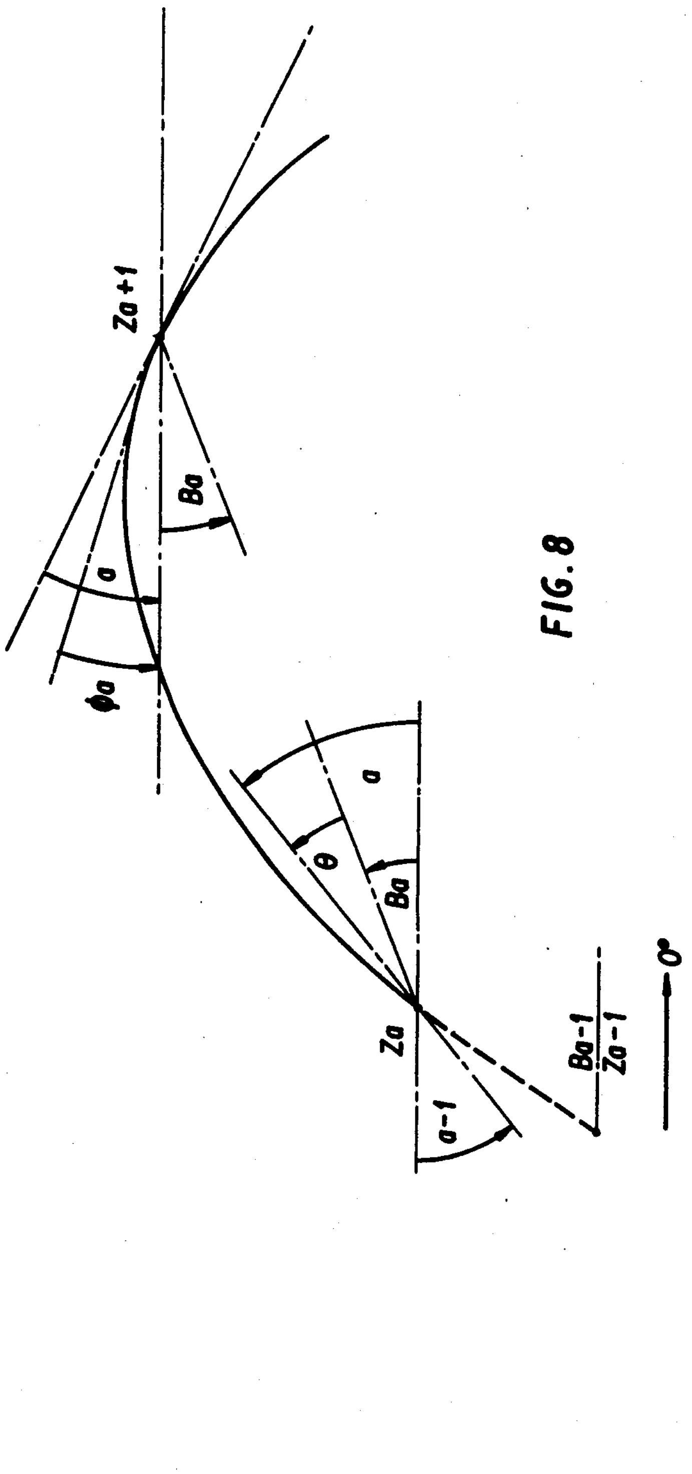
FIG. 8 shows the angular relationships about a set of knots $Z_a$ and $Z_{a+1}$ when it is desired that a smooth continuous curve pass between the knots.

The use of override control code 9 is shown in FIG. 6*a* where a knot joins a straight line curve $Z_a$, $Z_{a+1}$ to a smooth continuous curve, $Z_{a+1}$, $Z_{a+2}$. In this case, $ɬ_{a+1}$ is set equal to $B_a$.

Where a knot joins a curve section $Z_a$, $Z_{a+1}$ to a straight line curve, $Z_{a+1}$, $Z_{a+2}$, as shown in FIG. 6*b*, then $ǥ_a$, the exit angle for curve $Z_a$, $Z_{a+1}$ is made equal to $B_{a+1}$, the interknot angle between $Z_{a+1}$, $Z_{a+2}$.

It should be understood, however, that if a knot joins two straight lines, this rule shown with respect to FIG. 5 is used in the preferred embodiment.

Control code 1Ø directs a curve interpolation at a sharp knot and is used to form a cusp at the entrance knot or the exit knot of a smooth continuous curve segment joined by that knot to a straight line. Shown in FIG. *7a*, are two examples, i.e. the curve $Z_a$, $Z_{a+1}$ is formed with a sharp knot at the entrance knot $Z_a$ and the curve $Z_{a+1}$, $Z_{a+2}$ is formed with a sharp knot at the exit knot $Z_{a+2}$. This control code is useful in overriding a default command code which would otherwise require that the sharp knot at $Z_a$, for example have an entrance angle for curve $Z_a$, $Z_{a+1}$ equal to $B_a$ which would introduce a distortion in curve $Z_a$, $Z_{a+1}$ at area 31, approximate the entrance knot $Z_a$ for curve $Z_a$, $Z_{a+1}$, as shown in FIG. *7b*. Similarly, a distortion would be introduced in a smooth continuous curve terminating in a sharp knot. For examplpe, in curve $Z_{a+1}$, $Z_{a+2}$ as shown by numeral 33 in FIG. *7b*, approximate the exit knot $Z_{a+2}$, where $g_{a+1}$ would be forced to equal $B_{a+1}$ to form a cusp. code 10 overrides the default command code and forces $\theta$ (i.e. $\theta_a$) to be equal to $\phi$ (i.e. $\phi_a$).

Where a cusp is to be formed at knot $Z_a$, the default command code would specify that the exit angle, $ǥ_a$ at knot $Z_a$ would be equal to the interknot angle $B_{a-1}$ at the preceding knot $Z_{a-1}$, for curve $Z_{a-1}$, $Z_a$, and the entrance angle $ɬ_a$ for curve $Z_a$, $Z_{a+1}$ would be equal to the interknot angle $B_a$ between the entrance knot $Z_a$ for curve $Z_a$, $Z_{a+1}$ and its exit knot $Z_{a+1}$. As stated above, this would produce the result shown in FIG. *7b*, and a distortion of the smooth continuous curve $Z_a$, $Z_{a+1}$ shown in FIG. *7a*. With the result of FIG. *7b*, the deviance angle $\theta_a$ between $B_a$ and $ɬ_a$ would be zero as stated above. In this case, to avoid the distortion shown by numerals 31, 33 in FIG. *7b* and to produce the smooth continuous curve as shown in FIG. *7a*, $\theta_a$ is forced equal to $\phi_a$ the deviance angle, at exit knot $Z_{a+1}$, as stated above. In the case shown in FIG. *7a*, arranged, for the sake of explanation $ǥ_a$ is equal to zero, $\phi_a$ is equal to $B_a$.

A similar result is forced by using a code 1Ø to control the shape of curve $Z_{a+1}$, $Z_{a+2}$ at exit knot $Z_{a+2}$. As stated above, the default command code responsive to a cusp at $Z_{a+2}$ for example, would direct the curve $Z_{a+1}$, $Z_{a+2}$, to the shape shown in FIG. *7b* and particularly shown by numeral 33 approximate $Z_{a+2}$ by directing that the exit angle $ǥ_{a+1}$ at knot $Z_{a+2}$ is equal to the interknot angle $B_{a+1}$ at the entrance knot $Z_{a+1}$ for that same curve. However, by using code 11 to direct that $\phi_{a+1}$ is equal to $\phi_{a+1}$, then at exit knot $Z_{a+2}$ for curve $Z_{a+1}$, $Z_{a+2}$ $ǥ_{a+1}$ is equal to $2^*B_{a+1}$ ($ǥ_a=0$, $ɬ_{a+1}=0$, $\theta_{a+1}=ɬ_{a+1}-B_{a-1}$).

For the sake of explanation, $ɬ_{a+1}$ is equal to Ø, for curve $Z_{a+1}$, $Z_{a+2}$.

The effect of code 1Ø is to produce a smooth continuous curve from or to a cusp such as at entrance knot $Z_a$ or at exit knot $Z_{a+2}$ and symmetrical about the respective curve midpoints, as shown by numeral 35 and numeral 37, respectively for curve $Z_a$, $Z_{a+1}$ and for curve $Z_{a+1}$, $Z_{a+2}$.

Control code 1Ø is to override a default command code which would otherwise specify a cusp, such as where the exterior angle as described above was above a threshold such as 4Ø° as shown in the preferred embodiment, or the interknot distance was greater than a predetermined distance, such as 12Ø units in the preferred embodiment. In this case, a smooth knot would be formed as described above, by taking the average of the interknot angles between a preceding knot and the subject knot and the subject knot and a successive knot in the outline loop direction of the closed outline loop. However, as explained above, if the absolute value of the interknot angles between the preceding knot and the subject knot and the subject knot and the successive knot is greater than 18Ø°, then the supplemental average is used by supplementing the average angle by 18Ø°. This is to orient the angle in the correct direction where the relationship of the average angle described above would result in a resultant angle 18Ø° out of phase with its correct direction.

The application of the inventive principles will force the angular relationships of ɬ ǥ, $\theta$ and $\phi$ at the respective knots to conform to the rules described above, as necessary to produce the desired curve, straight line, cusp, or smooth knot, whether directed by the default command codes or by the override control codes. It should be noted, however, that where an override control code is used, it is used to force a result contrary to what would ordinarily be produced using the default command codes. For example, if the default command code would produce a cusp and a smooth knot was desired followed by a smooth continuous curve or preceded by a smooth continuous curve, then a code 1Ø would be used. If the default command code would have produced a smooth continuous curve, and a straight line joining a sharp knot is desired, then a code 8 would be selected. If a smooth knot is desired joined to a straight line, then a code 9 may be selected to override the default command control. All of the foregoing is shown in connection with FIGS. 5, 6, 6*a*, 7, 7*a* and 8 and in the text accompanying these figures.

Figure 9:
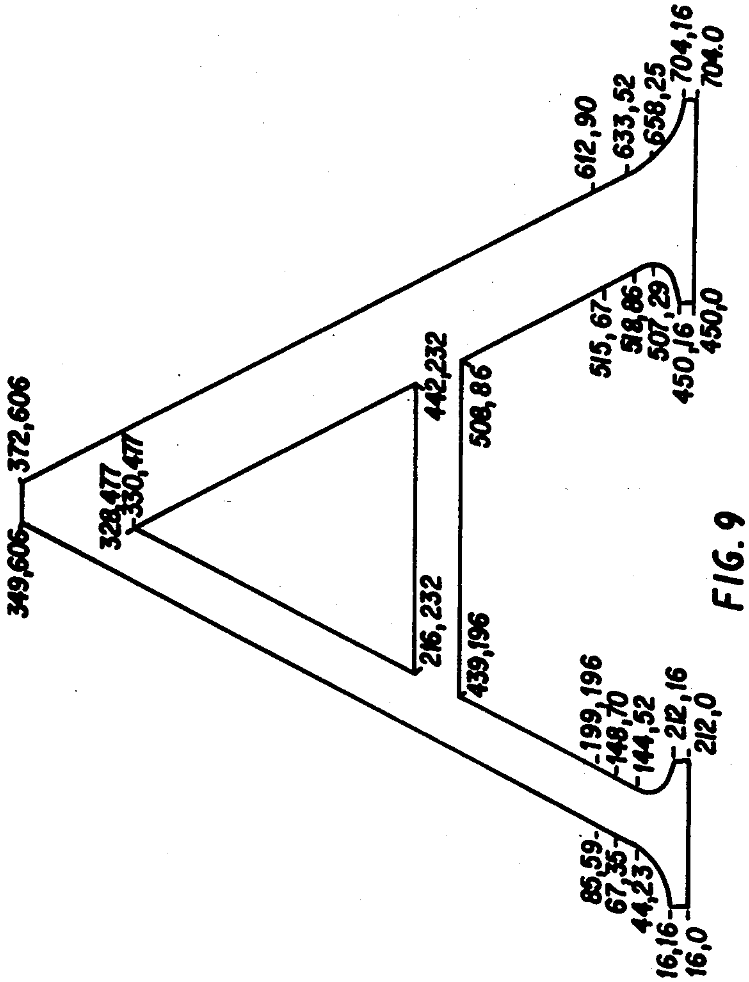
FIG. 9 shows a character as may be produced according to the principles of the invention.

A typical encoding for an A as shown in FIG. 9 is shown in the appendix. The compiler for decoding the packed encoded information is also shown below, and is used with a Motorola 68000 processor. As the desired output is a series of intercepts at the intersection of the locus of the character outline, and the display raster lines, these intercepts can be converted into modulating information for imaging the character on an imaging surface by any suitable well-known imaging device.

For the sake of explanation and in the way of an example, a closed data loop for the encoded A shown in FIG. 9, is set forth below and described.

CLOSED DATA LOOP FOR THE "A" OF FIG. 9
(Given in hexadecimal Notation)

| | | | | | | | | | | | | | | | |
|---|---|---|---|---|---|---|---|---|---|---|---|---|---|---|---|
| 83 | 98 | 3C | 82 | E8 | 5E | 02 | 4C | 01 | 5C | 02 | 5E | 16 | 49 | 00 | 5B |
| 30 | B2 | 54 | D6 | 75 | 96 | 83 | 78 | 81 | A7 | D7 | 5A | 37 | 1B | 80 | 7C |
| 57 | 3A | 83 | 89 | 0E | 85 | E0 | 28 | 24 | 15 | C0 | 20 | 49 | 77 | 96 | 88 |
| 7D | 2F | 30 | 60 | 62 | F1 | 6D | 0F | 60 | 26 | AD | 28 | 20 | C1 | 8A | 88 |
| 06 | 50 | 10 | 06 | 95 | 99 | 7B | 88 | 58 | 80 | B0 | 82 | 08 | 01 | 3A | 70 |
| FF | FF | 00 | 10 | 79 | 06 | 50 | 37 | 31 | 19 | 7B | 73 | 53 | 81 | 51 | 79 |

As stated above, the closed data loop is encoded on data words of 4 bit or nibble boundries and the sequence of the nibbles is as given below. In accordance with the preferred embodiment, the first two bytes 5B of the closed data loop indicate the total number of bytes in the data loop for a closed outline loop. The first two bytes, 00 **5*b* indicates that there are 91 bytes total in the data loop for the symbol A, describing outside closed outline loop 31 in the direction of arrows 31 and inside closed outline loop 35 in the direction of arrows 35**.

In accordance with the preferred embodiment, the starting X and Y coordinates are given in three nibble packs of information for each respective X and Y location. Accordingly, the next three nibbles, 6 49 relates to the starting X location. In accordance with the principles of the invention and the preferred embodiment, the least significant bit of the data for a new X or a new Y location is a sign bit indicative of the direction. Accordingly, in processing the data in the preferred embodiment, a shift of one binary position is made to remove the sign bit, giving a decimal data value of 804. As described above in the preferred embodiment, since the origin of the $M^2$ is offset by 592 units, 592 must be subtracted from 804 to provide the correct X coordinate with reference to the origin of the $M^2$ of 212. The sign of the X direction, whether positive or negative with regard to the origin of the $M^2$ is given by the sign bit and is positive if the sign bit is zero, in the preferred embodiment.

In accordance with the principles of the invention, the starting Y position given as a new Y position is indicated by the next nibble series of 3 nibbles or by 5E1, which is divided by 2 to remove the sign bit yielding the result of 750. In accordance with the offset of the $M^2$ at 736 units, 736 is subtracted from 752 to yield a Y coordinate of 16. The sign bit which is a 1, indicates a negative direction for Y. Accordingly for the "A" of FIG. 9, the start point x, y coordinates shown as numeral 39, is 212, 16 with the new direction being x, −y.

As stated in the preferred embodiment, the data pack is decoded by using the first two bytes to indicate the number of bytes in the closed data loop corresponding to the coordinate points around the closed outline loop, and by three nibbles each comprising twelve bits corresponding to the respective X and Y start locations. It should be noted that wherever the X coordinates are defined by new coordinate values, the least significant bit is used as a sign bit to indicate the coordinate direction. The process performs a divide by two which separates that bit to define the aforesaid direction signed. Additionally, the X position is referenced to the home or reference position in the $M^2$ which may be offset with regard to the origin of the master encoding grid by subtracting the offset from a coordinate position accordingly. With this in mind, the following process is described which produces the listing of coordinates shown below and in FIG. 9.

As stated, the start position is at XY coordinates 212, 0. As the last bit of data accessed from the data pack, to provide complete information for the preceding nibble series was the tenth nibble corresponding to hexadecimal number 5. The next nibble which follows a complete information series of nibbles is a first nibble value.

As shown, the first nibble value 2 indicates a case Ia and according to table II directs the access of the next three nibbles, 5C0 indicative of the new X coordinate position. In accordance with the procedure above, a division by 2 removes the sign bit and a subtraction process is performed relative to the $M^2$ offset, to reference the new Y position to the $M^2$ home position or at zero. The first nibble value "1", following the nibble series for the completed information set of 5C02 then indicates a case Ia and a new X coordinate. In accordance with the process described above, a binary division of two is performed to isolate the sign bit, indicate the direction and a subtraction is performed to reference the new X position to the home position. Accordingly, the new X position is 16.

The next coordinate position of 16,16 is given by the complete information set 2E8, with the nibble series first nibble value 8 indicating of a Case III. In accordance with the format of the data pack as shown in Table I, P=X is equal to 01110 and Q=y is equal to 00010. This translates to 14 and 2 in decimal rotation respectively. In accordance with the preferred embodiment, as it would be redundant to use Cases II, III and IV, for a translation of 0, a 1 is added to the results of p=x and q=y to provide the new X and Y coordinate distances of 15 and 3 respectively. The p value is added to previous X value of 16 to provide a new X value of 31, and the q value is added to the previous Y value of 16 to provide a new Y value of 19 accordingly.

As a reminder, it should be understood, that this process of decoding the data pack being described is designed to decode the encoded knot coordinates only. After decoding the inventive principles described herein are applied to the knots to either produce a series of nodes describing a smooth continuous curve between the knots, as between knots 16, 16, and knots 31, 19 or a straight line as between knot 212, 0 and knot 16, 0. In accordance with the preferred embodiment, the direction of the knots indicated by the completed information set 2E8 relative to the previous knot is in accordance with the direction established by the last previous sign bit accessed for the respective X and Y directions as shown above, or by 567 as described below.

The next nibble following the nibble series for the completed information set above has the first nibble value of 8 which is a Case III, directing the access of the next two nibbles for providing the nibble series for complete information set of 3C8 corresponding to a p=x value of 13 and a q=y value of 4 in accordance with the format shown in Table II. In accordance with the preferred embodiment, the direction of the knot denoted by this complete information set follows the last previous direction indication given and is accordingly added to the previous coordinates of 31 and 19 to provide new coordinates of 44 and 23.

In accordance with the foregoing, the next nibble being a first nibble value is 8 which accordingly directs the access of the next two nibbles to provide a complete information set of 398 producing new coordinate values of 54, 27, accordingly.

The next nibble corresponding to a first nibble value of 8, as described above, indicates a case 8 and directs the access of the next two nibbles to form the nibble series corresponding to the complete information set of hexadecimal 7C8 and according to the processing described above decoding the new coordinates of 67, 35.

As can be seen, the smooth continuous curve between knot end points 16,16 and passing through knots 31, 19 and 44, 23 and 54, 27 and, 67, 35 are formed according to the principles of the invention to form a smooth continuous curve.

The next first nibble value of the next complete information set is zero indicating Case Ib which directs the access of another nibble to form a two nibble series complete information set. As the next nibble was 8, for Case Ib, a value of 3 is added thereto forming a value of 11, indicative of control code 11 directing a smooth continuous curve be formed between the last knot having coordinate 67, 35 and the next knot which is to be indicated by the next complete information set accessed from the closed data loop.

As the first nibble value of the next complete information set is B indicating Case III, 3 nibbles are accessed forming a 4 nibble series describing the next complete information set and producing the new coordinates of 85, 59.

The next first nibble value of the next nibble series for the next complete information set is 3 indicating Case Ia, control code 3, shown in Table II, and which directs the access of a pair of three nibbles each which are indicative of the next X and Y positions and directions thereof relative to the previous knot. In accordance with the process described above, the new X and Y position is 349, 606 and as the distance between this new knot and the previous knot is greater than 128 units, the default command code directs linear interpolation. In accordance with the above, the hexadecimal value 75A corresponds to the new X position and A7D corresponds to the new Y position. As stated above, the least significant bit of each of the above 3 nibbles corresponds to the relative direction of the new X and Y points.

The first nibble value of the next nibble series for the next complete information set is 1 indicating a Case Ia and directing the access of the next three nibbles of 7A8 to replace the X coordinate with 372 and a new set of coordinates 372, 606.

The next first nibble value for the next nibble series is a 3 corresponding to a case Ia, a control code 3 and the access of a pair of 3 nibbles, i.e. 968, corresponding to the new X position and 675, corresponding to the new Y positions and new X, Y coordinates of 612, 90 respectively.

The next first nibble value following the nibble series for the complete information set above is D, corresponding to Case IV which directs the access of the next three nibbles to form the 4 nibble series 254, and which according to the form shown in Table I provides a p=x value of 20 and a q=y value of 37. According to the process described above, a 1 is added to the p=x value and the q=y value to form decimal coordinate values of 21 and 38. Following the most recent X, Y coordinate direction instructions given, the X incremental value is added to the previous coordinate 612 providing the new X coordinate of 633 and the Y incremental value is subtracted from the previous Y of 90 to provide a new Y coordinate value of 52.

The next first nibble value of the next nibble series for the next complete information set is a B corresponding to Case III which directs the access of two more nibbles to form a three nibble series, complete information set, and producing the next coordinate values of 650, 32 for X and Y respectively.

The next first nibble of the next nibble series for the next complete information set is 8 corresponding to a Case III, causing the access of the next two nibbles to produce a three nibble information set and new coordinate values of 659, 25 for X and Y respectively.

The next first nibble value is a 9 corresponding to case III and directing the access of the next two nibbles of 77 and corresponding to new X and Y coordinate 683, 17.

The next first nibble value is a 9 causing the access of the next two nibbles 04 and corresponding to the new X, Y coordinates with 704, 16.

The next new first value is 2 corresponding to Case Ia and directing the access of the next three nibbles corresponding to the 5C0 corresponding to a new Y value with the direction indicated by the first significant bit therein and producing new XY coordinates of 704, 0 respectively.

The next nibble value of the next nibble series for the next complete information set is 1 corresponding to a Case Ia and directing the access of the next two nibbles forming a three nibble series complete information set 824 and corresponding to the new X, Y location of 450, with respect to the last previous direction given for the axial directions X and Y.

The next first nibble value 4, the next complete information set is 2 corresponding to case Ia and to complete information sets 5E0 corresponding to new XY coordinates 450, 16.

The next first nibble value is 8 corresponding to Case III and as described above corresponding to complete information set 0E8 and new XY coordinates 465, 17.

The next first nibble value is 9 corresponding to Case III and complete information set 389 and new XY coordinates 490,21.

The next first nibble value is 8 corresponding to Case III and complete information set 38A and new XY coordinates 501,25.

The next first nibble value is 7 corresponding to Case II which directs the access of another nibble and according to the format shown in Table II provides a p=x value of binary 101 corresponding to a decimal value of 5 to which one is added in accordance with the procedure above to provide a decimal value of 6 for the new X coordinate incremental distance. Similarly, the q=y value is binary 011 which corresponds to a decimal value of 3, to which one is added in accordance with the process above to provide a new value of 4 corresponding to the incremental Y coordinate distance. The new XY coordinates are therefore 507,29 accordingly to the directions given in the last previous direction instruction.

The next first nibble value is 8 corresponding to Case III and the access of two more nibbles to form the complete information set A88 and XY coordinates 516, 40.

The next first nibble value is 8 corresponding to Case III, the access of the next two nibbles form a complete information set C18 and new coordinates XY of 518, 53.

The next first nibble value is zero corresponding to case Ib which directs the access of the next nibble to, which 3 is added in accordance with procedures described above to form the control code 5. As shown in Table II is an X Negate which changes the X direction from its previous direction. The next first nibble value is an 8 corresponding to Case III and in accordance with the foregoing new X, Y coordinates 515, 67.

The next first nibble value is 8 corresponding to case III and new coordinates of X, Y of 508, 86, respectively in accordance with the above procedure.

The next first nibble value is a 0 corresponding to case Ib which directs the access of the next nibble 6 to which 3 is added according to the above procedure to provide a control code of 9. 9 as shown in Table II is a line smooth direction.

The next first nibble value is F corresponding to Case IV and in accordance with the procedure above causes the access of three more nibbles forming the complete information set 600F and new X, Y coordinates 459, 196 in accordance with directions as given.

The next first nibble value is 1 corresponding to Case Ia which directs the access of the next three nibbles, 62F indicative of an X coordinate point in accordance with the last previous directions given. Accordingly, the new X, Y coordinates are 199, 196.

The next first nibble value is zero corresponding to Case Ib and directs in the access of the next nibble having a value of 6 to which 3 is added in accordance with the above procedure to produce a 9 corresponding to control code 9. A next first nibble value is zero once again corresponding to Case Ib which directs the access of a next nibble which is 3 to which 3 is added giving the control code value 6 which means negate Y.

The next first nibble value is F corresponding to Case IV and in accordance with the above procedure causes the access of the next three nibbles to complete the information set 7D2F and producing new X, Y coordinates of 148, 70 which is connected to the previous X, Y coordinates 199, 66, according to the override control code 9 and in the new Y direction.

The new first nibble value is zero corresponding to case Ib and directing the access of the next nibble having a value of 7 to which 3 is added to give it the control code 10.

The next first nibble value is an A corresponding to Case III and directing the access of the next two nibbles to give the complete information set 13A and new X and Y coordinates 144, 52 respectively.

The next first nibble value is zero corresponding to Case Ib which directs the access of another nibble having a value 8 to which 3 is added in accordance with the above procedure to provide the control code 11.

The next first nibble value is zero corresponding to Case Ib directing the access of another nibble having the value 2 to which 3 is added giving the control code 5 which negates the previous X direction.

The next first nibble value is A corresponding to Case III and the access of two additional nibbles giving the complete information set B08 and new XY coordinates 145, 40.

The next first nibble value is zero corresponding to case Ib in accordance with the above procedure control code 11.

The next first nibble value is 8 corresponding to Case III, complete information set 858 and new XY coordinates 151, 31.

The next first nibble value is 8 corresponding to Case III, complete information set 7B8 and new XY coordinates 163,23.

The next first nibble value is 9 corresponding to Case III, complete information set 599 and new XY coordinates 189,17. The next first nibble value is 9 corresponding to complete information set 069 and coordinates 212, 16.

The above XY coordinates 212, 16 bring the traverse of the closed data loop bringing it back to the starting point.

The next first nibble value is zero indicating Case Ib with the next access nibble I to which 3 is added producing the control code value 4 indicating the end of closed data loop.

In accordance with the preferred embodiment, a routine is added, not shown, which would be known to one skilled in the art to ensure that the closed data loop decoding closes upon the start location of the closed data loop and completes the closed outline loop by ending at the start point encoding of the closed data loop which represents the start of the closed outline loop.

The second closed outline loop, shown by numeral 35 and arrows 37, of the A now starts at the closed data loop coded hexadecimal numbers 790, 650 corresponding to new X and Y coordinate values 216, 232 and the X and Y directions, derived according to the process given above with the regard to the start points for the foregoing loop, 31.

The next first nibble value is 1 corresponding to Case Ia and directing the access of the next three nibbles 815 and new XY coordinates 442, 232.

The next first nibble value is a 3 corresponding to a Case Ia, directing the access of a pair of three nibbles 735, and 97B corresponding to new X and Y coordinates of 330 and 477 in the negative X and negative Y directions accordingly.

The next first nibble value is 1 corresponding to Case Ia directing the access of the next three nibbles 731 corresponding to X coordinate 328, Y coordinate 477 in the negative X and negative Y directions accordingly.

The next first nibble value is 3 corresponding to Case Ia directing the access of a pair of three nibbles each corresponding to hexadecimal value 690 and 790 and X and Y positions 216, 232, respectively. As 216, 232 are the start points, the closed data loop representing the closed outline loop 35 has been completed and the next first nibble value is zero indicating Case Ib with the last nibble accessed accordingly being zero indicating the end of loop. Once again, the routine described above is used to insure that the closed data loop ends at its start point.

The above is a representative encoding of a letter used in the process to derive the coordinate values around the outline of the character and any override control codes which may be used to replace default command codes. However, it should be understood that changes to the codings could be used consistent with the principles of this invention, as claimed herein, and that the invention should not be restricted to the coding or decoding process shown above, with respect to the preferred embodiment.

AUTOSCALING LINEAR INTERPOLATION

Linear interpolation is a well-known technique and is not claimed as an invention in this application. The autoscaling linear interpolation which is claimed and which is described below is a method of increasing the precision of a machine interpolation procedure which uses as a start point, a first set of coordinates and as an ending point a second set of coordinates. The coordinates are usually expressed in respective coordinate directions such as x and y, for example. In the preferred embodiment, the process of linear interpolation is for the purpose of producing coordinate points along a straight line between the first and second end points, which coincide with a second coordinate system such as the intercepts in a raster display. Each of the coordinates are found by determining the slope of the straight line between the two end points which is equal to the incremental distance in a first coordinate direction divided by the incremental distance in a second coordinate direction (i.e. $Y_2-Y_1/X_2-X_1$). That first coordinate incremental distance is expressed in an encoded machine value as a first data word, (i.e. $Y_2-Y_1$), in a first machine location. The second coordinate incremental distance between the two end points in the second coordinate direction (i.e. $X_2-X_1$), is also expressed as a machine value and placed in a second machine location. The machine location limits the precision by which a data word may be expressed. For example, and as is well-known, each machine is based upon radix, which is a number base. The most common machine number base is the binary number base. Each data word accordingly, has a number of bit positions with each specified bit position being a specified power of that radix (i.e. $2^4$, $2^3$, $2^2$, $2^1$, $2^0$, $2^{-1}$, $2^{-2}$,). Accordingly, a shift of a data word in a direction of the most significant bits corresponding to higher exponential values or higher orders of the machine radix, results in an increase in the scale or value of the data word. Further, each shift in the direction of the most significant bits, results in an effective multiplication of the data word value by a scale factor of the machine radix raised to an exponential power corresponding to the number of bits shifted (i.e. 13 bit positions shifted is equal to a scale factor of $2^{13}$ in a binary machine or equivalent of 8196, in decimal notation. Conversely, each shift of a data word, towards the least significant bits, corresponding to lower exponential values or orders of that machine radix, corresponds to an effective division by the machine radix value and conversely to a reducing scale factor. Further, machine locations for storing data words are limited in the number of bits available. As the precision of a data word is a function of the data space and the number of bits available for storing that data word, an increased precision for expressing a data word are obtainable by extending the number of bits or size of a machine location available for specifying a data word. For example, as is well-recognized, in a decimal system, the number 5.632498 is a more precise value than 5.3624 which lacks the last three significant places (i.e. 0.000098), of the former number. In binary, the number 10111.101 is a more precise expression than that number truncated or rounded to 10111.000, as the latter number is missing the bits 0.101 and is therefore less precise. However, the former binary expression requires a larger machine location for specifying all the relevant bits in that expression. The "point" in the above binary and decimal values are used to indicate the positions, according to the radix system used, to indicate position values equal to or greater than 1 (decimal) and less than 1 (decimal)(i.e. integer and fractional values).

The effect of shifing to increase the scale of the Y increment is to eliminate the binary point in a third data word representing the slope of Y incremental value and thereby avoiding floating point arithmetic operations. The point separates the bit positions in the radix system selected, separating fractional from integer values in a data word having values equal to or greater than 1 and less than 1 (i.e. between the bit positions "$2^0$" and "$2^{-1}$". The binary point is equivalent to the decimal point in a radix 10 system and equivalent to a "point" between those machine positions having a value equal to or greater then 1 and less then 1 in any system and as stated, separating the fractional values from the integer values in the slope or Y increment value. By shifting a machine representation of a number in the direction of more significant bits, the scale of the number is increased, thereby moving the "point" effectively in the direction of the less significant bits. If a sufficient number of bit positions are shifted, the binary point is eliminated from the number. In this way, floating point arithmetic is avoided.

According to the invention, linear interpolation proceeds according to the known method by determining the coordinate distance in a first coordinate direction and in a second coordinate direction between a set of end points. The method is used in the machine having a radix "r" cooresponding to the values of designated bit positions in the encoded words used within the machine. The process continues by encoding a first data word on "N" bits corresponding to the distance between the first and second end points in the first coordinate (i.e. $Y_2-Y_1$), and then placing that first data word in a first machine location. To complete the process of calculation the slope, according to the interpolation method, a second data word of M bits corresponding to the distance between the first and second end points (i.e $X_2-X_1$) in a second coorindate direction is encoded and placed in a second location. The machine is now ready to use the data value in the first location and a data word value in the second location in a process of division to produce a third data word corresponding to the slope of the straight line between the first and second end points (i.e. $Y_2-Y_1/X_2-X_1$). To increase the precision or resolution of the third data word according to the inventive process, the scale of the first data word (i.e. $Y_2-Y_1$), is increased by determining the the number of available positions between the most significant position of the first data word and the most significant position of the first machine location. The first data word is then shifted in a first direction towards the most significant positions in that first machine location, utilizing those more significant positions which were unused, when expressing the first data word. The scale of the first data word is again increased by shifting a second time in the same first direction of the most significant positions by a number of positions cooresponding to the number of bit positions used to encode the second data word (i.e. $X_2-X_1$). In the preferred embodiment, the first machine location is expanded to accommodate this additional shift. It should be noted that the inventive principle is not limited to the size of available data space in any one machine or to any machine radix.

In the preferred embodiment, the second shifting operation described above occurs in an extension to the first machine location. The quotient corresponding to the slope (i.e. $Y_2-Y_1/X_2-X_1$) produced as the third data word by division of the first data word by the second data word will reduce the first data word to a size coextensive with the first machine location. As a result then, the data word may be raised by a scale factor corresponding to a shift in the direction of the most significant positions corresponding to the number of significant positions used to express the denominator (i.e. $X_2-X_1$) or second data word, as the next division step cancels that said shift of the first data value by the said number of bit positions in the second data word and cooresponding reduces its position length to the size of the first machine location.

The third encoded data word (i.e. the Y incremental value for each X increment) is then stored and added to the first data word (i.e. $Y_1$). The second data word (i.e. $X_1$) is incremented a coordinate word value corresponding to the first and second coordinate positions of a point along the line are then stored. In Table III are given the coordinate X, Y values; the value of Y incremented at its highest precision and scale factor for the example shown.

In the iterative process, the third encoded data word at the higher resolution, produced, corresponding to the slope produced according to the above, is used iteratively as a Y incremental value to derive a cumulative Y incremental value related to a respective X coordinate value in the first direction (i.e. Y) and stored as a cumulative Y. As no change has been made to the precision (i.e. the number of positions used to express the third data word), the precision of the third data word is the same as the first data word, produced by shifting the first data word and increasing its scale, as described.

As interpolation is an iterative process, the data word (i.e. the Y incremental value at the said higher precision), is used to produce the cumulative Y, related to the Y coordinate for a respective X coordinate.

As the purpose of producing data word values corresponding to points along a straight line, is to produce intercepts on a display coordinate system, the scale cumulative Y words are reduced to the scale used to express the end point coordinate values, by the step of truncating or rounding. Truncating may be accomplished by discarding a predetermined number of least significant bits or rounding may be used by a shift in the direction of the least significant bits, minus one, adding a bit corresponding to the rounding value such as 0.5 (decimal) and discarding any bits having values less than the least significant bit value of interest. In the preferred embodiment, truncating or rounding is to the position of the lowest integer value in the radix 2 systems (i.e. to bit position $2^{\circ}$).

In the foregoing manner, the scale of cumulative Y is then reduced to fit scale of the data words for the end point coordinates. In the preferred embodiment, the original precision is that of the coordinates on a display which are the display intercepts, shown as X, Y in Table III. The result of using this method is to avoid the incremental error introduced into each cumulative Y value by summing Y incremental at a lower scale.

The incremental value at the increased scale factor may be used to derive a cumulative Y for each respective coordinate X values by iteratively incrementing Y increment by Y increment to produce a first cumulative Y and then incrementing that first cumulative Y with the Y incremental value and so on to produce a series of distinct cumulative Y values at the higher scale factor for each X coordinate. The discrete cumulate Y values may then be reduced by the scale factor to the scale of the numerator (dx) before shifting and added to the initial Y coordinate value to produce the correct Y coordinate for each respective X coordinate. By producing the cumulative Y using Y increment at the increased scale factor, cumulative errors in the Y coordinate value due to an error in the cumulative Y value due to the lower scale factor of Y increments are avoided.

An example is shown in Table III. In the preferred embodiment, a radix 2 machine is used with locations of 16 bits each used and with the most significant or 16th bit being used for a sign bit. The Y register, therefore, corresponding to a first data word of 120 would be 0000 0000 0111 1000. As the leftmost or most significant bit of the register is not available for indicating the numerical value, as it is a sign bit in the preferred embodiment, then the first data word expressed in binary, may be shifted to the left in the direction of the most significant bits, a total of eight places corresponding to the eight zeros or unused binary bit positions to the left of "111 1000." The updated first data word, as shown in the register is now 0111100000000000 corresponding to a decimal value of 30,720.

The denominator corresponding to the distance between the end points in a second coordinate direction and to the second data word is the binary word 0000 0000 0011 0010 equal to a decimal value of 50. The quotient produced by the division of the dividend or first data word by the denominator or second data word produces a quotient having a number of bits related to the number of bits in the dividend reduced by the number of bits in the divisor or denominator. In the divisor, the most significant bit is in the 6th bit position corresponding to a decimal $2^5$ or decimal of 32. The numerator corresponding to the first data word and expressed as the 16 bit binary word 0111 1000 0000 0000 may be raised by an order of the radix, (i.e. $2^5$) corresponding to the order of the most significant bit position of the denominator, with the assurance that the quotient will fit within the register size containing the first data word after shifting above and without loss of any significant bits in the quotient, such as, for example, bit corresponding to the remainder.

To summarize the foregoing, the precision of data word for the numerator value, used in deriving the slope can be raised within the space allotted by a machine register by shifting the significant bits of that data word to the left or towards the most significant bit in the register equal to the number of unused bits in the register or in the example between the most significant bit position for the first data word shown, or seventh bit position and the most significant bit position available in the register. This causes the binary word corresponding to the numerator to be stated at its highest value thereby avoiding floating point arithmetic. The precision of the slope used in linear interpolation may be further increased by expanding the register space available for storing that binary word and shifting hat first data word to the left, effectively raising it by a power of the radix used, corresponding to the number of significant bits in the denominator or divisor. As stated above, as the slope is the quotient produced by the division of the dividend or numerator (first data value), by the divisor or denominator (second data value), a shift of the numerator by the number of significant bits in the denominator, after division produces a quotient having a number of significant bits no greater than the dividend. In this way, the precision of the quotient or incremental value in the first coordinate direction is maintained equal to the precision of a numerator.

To continue with the example above, as the divisor contains 6 significant bits corresponding in binary notation to it $2^5$ or 32 then the numerator may be shifted to the left for a total of 13 places by increasing the scale, raising the value of the first data word by a scale factor of $2^{13}$. As $2^{13}$ equals decimal 8192, the arithmetic accomplished in binary form and expressed in decimal is $$\text{dec. } \frac{120 \times 8192}{50} = \frac{F0000}{32}\ HEX$$

where $120 = Y_2 - Y_1$;

$50 = X_2 - X_1$;

The first coordinate or Y incremental value is expressed in decimal as 19660/8192=2.399902 or 4CCC in HEX. The actual incremental value defined by the coordinate end points is 120/50=2.4. The difference between the Y incremental value, expressed as a third data word and the actual slope is $4\times10^{-3}\%$ error. As shown in Table III, the Y incremental produced at the higher precision is used to iteratively increment Y, which is then reduced in scale accordingly and added to the first end point in the first coordinate direction (Y direction) and that Y coordinate value is stored. In reducing the scale, the Y value may be truncated or rounded, to produce an intercept value, for example. As shown in Table III below, the intercept value is shown as produced by truncation and rounding.

Additionally, to increase the speed of the process, the value of the first data word or numerator may be compared to successive entries in an ordered set of values. By a comparison of the value of the first data word it can quickly be determined whether the coordinate difference (i.e. $Y_2-Y_1$) is greater or lesser than a value in a particular position of the set values. Accordingly, the set of values may be arranged in decreasing orders of the machine radix, (i.e. $2^{13}, 2^{12}, \ldots 2^0$). By a successive process of comparison in the decreasing order, it can easily be determined where in this procedure, the first data word in the first machine location is less than a value in the set of values. Then that particular value in the set of values could be referenced to an index value to indicate the number of bits available in the numerator register for shifting the first data word. It should be noted that according to the principles of the invention, it is not necessary where the denominator is a power of two, such as two or four, to divide, saving additional time, as shifting of the numerator accomplishes the same result.

Accordingly, the above process is equally valid for the reverse process where the set of values is in increasing order and the comparison is in the increasing order with the particular value of interest in the set being the first greater than the first data word.

In this way, it is possible to avoid floating point arithmetic by increasing the value of the numerator and corresponding to the number of unused bits available in the register for shifting while further increasing the value of the numerator corresponding to the number of significant bits in the denominator to maintain the power of two of the most significant bit of the quotient equal to the power of two of the most significant bit of the dividend and thereby increasing the precision of the quotient and the answer. Additionally, it is possible to use a set of values such as a look up table for example, to compare the value of the numerator to values in the denominator, selecting as an index number related to a value in said set of values to indicating the number of positions available for shifting the numerator by arranging the set of values in an order of values corresponding to decreasing or increasing orders of the radix and successively comparing the numerator value in the order of said decreasing or increasing powers of the radix until a particular value is found which is greater or less, respectively than the numerator value. That particular value can then correspond to an index value corresponding to the power of two available in the register for shifting the numerator and increasing its value by a power of two.

As would be apparent to those skilled in the art, the inventive principles can be applied to any radix system or to any coordinate system.

TABLE III

Start Point
$X_1,Y_1$ = 0,0 — Y incremental = 19660 dec.; 4CCC Hex
End Point — Delta_X = 50
$X_2,Y_2$ = 50,120 — Delta_Y = 120 — Scale Factor = 105134 dec.

| (truncated) X,Y | (rounded) Y | | Cumulative incremental Y per X coordinate | |
|---|---|---|---|---|
| 1,2 | [2] | Sum= | 19660 = | 4CCChex |
| 2,4 | [5] | Sum= | 39320 = | 9998hex |
| 3,7 | [7] | Sum= | 58980 = | E664hex |
| 4,9 | [10] | Sum= | 78640 = | 13330hex |
| 5,11 | [12] | Sum= | 98300 = | 17FFChex |
| 6,14 | [14] | Sum= | 117960 = | 1CCC8hex |
| 7,16 | [17] | Sum= | 137620 = | 21994hex |
| 8,19 | [19] | Sum= | 157280 = | 26660hex |
| 9,21 | [22] | Sum= | 176940 = | 2B32Chex |
| 10,23 | [24] | Sum= | 196600 = | 2FFF8hex |
| 11,26 | [26] | Sum= | 216260 = | 34CC4hex |
| 12,28 | [29] | Sum= | 235920 = | 39990hex |
| 13,31 | [31] | Sum= | 255580 = | 3E65Chex |
| 14,33 | [34] | Sum= | 275240 = | 43328hex |
| 15,35 | [36] | Sum= | 294900 = | 47FF4hex |
| 16,38 | [38] | Sum= | 314560 = | 4CCC0hex |
| 17,40 | [41] | Sum= | 334220 = | 5198Chex |
| 18,43 | [43] | Sum= | 353880 = | 56658hex |
| 19,45 | [46] | Sum= | 373540 = | 5B324hex |
| 20,47 | [48] | Sum= | 393200 = | 5FFF0hex |
| 21,50 | [50] | Sum= | 412860 = | 64CBChex |
| 22,52 | [53] | Sum= | 432520 = | 69988hex |
| 23,55 | [55] | Sum= | 452180 = | 6E654hex |
| 24,57 | [58] | Sum= | 471840 = | 73320hex |
| 25,59 | [60] | Sum= | 491500 = | 77FEChex |
| 26,62 | [62] | Sum= | 511160 = | 7CCB8hex |
| 27,64 | [65] | Sum= | 530820 = | 81984hex |
| 28,67 | [67] | Sum= | 550480 = | 86650hex |
| 29,69 | [70] | Sum= | 570140 = | 8B31Chex |
| 30,71 | [72] | Sum= | 589800 = | 8FFE8hex |
| 31,74 | [74] | Sum= | 609460 = | 94CB4hex |
| 32,76 | [77] | Sum= | 629120 = | 99980hex |
| 33,79 | [79] | Sum= | 648780 = | 9E64Chex |
| 34,81 | [82] | Sum= | 668440 = | A3318hex |
| 35,83 | [84] | Sum= | 688100 = | A7FE4hex |
| 36,86 | [86] | Sum= | 707760 = | ACCB0hex |
| 37,88 | [89] | Sum= | 727420 = | B197Chex |
| 38,91 | [91] | Sum= | 747080 = | B6648hex |
| 39,93 | [94] | Sum= | 766740 = | BB314hex |
| 40,95 | [96] | Sum= | 786400 = | BFFE0hex |
| 41,98 | [98] | Sum= | 806060 = | C4CAChex |
| 42,100 | [101] | Sum= | 825720 = | C9978hex |
| 43,103 | [103] | Sum= | 845380 = | CE644hex |
| 44,105 | [106] | Sum= | 865040 = | D3310hex |
| 45,107 | [108] | Sum= | 884700 = | D7FDChex |
| 46,110 | [110] | Sum= | 904360 = | DCCA8hex |
| 47,112 | [113] | Sum= | 924020 = | E1974hex |
| 48,115 | [115] | Sum= | 943680 = | E6640hex |
| 49,117 | [118] | Sum= | 963340 = | EB30Chex |
| 50,120 | [120] | Sum= | 983000 = | EFFD8hex |

The effect of shifting to increase the scale of the Y increment is to eliminate the binary point in a third data word representing the slope and Y increment and thereby avoiding floating point arithmetic operations. The binary point separates the bit locations separating fractional from integer values in a data word (i.e. having values equal to or greater than 1 and less than 1 (i.e. between the bit positions "$2^0$" and "$2^{-1}$". The binary point is equivalent to the decimal point in a radix 10 system and equivalent to a "point" between those machine positions having a value equal to or greater than 1 and less than one in any system and separating the fractional values from the integer values in the slope or Y increment value.

By shifting in the direction of more significant bits, the scale factor of Y increment is increased, thereby moving the "point" effectively in the direction of the less significant bits. If a sufficient number of bit positions are shifted, the binary point is eliminated from Y increment. In this way, floating point arithmetic is avoided. The value of Y increment at the increased scale factor may be used to derive a cumulative Y for each respective coordinate X values by iteratively incrementing Y increment by Y increment to produce a first cumulative Y and then incrementing that first cumulative Y with Y increment and so on to produce a series of distinct cumulative Y values at the higher scale for each X coordinate. The discrete cumulate Y values may then be reduced by the scale factor to the scale of the numerator (dx) before shifting and added to the initial Y coordinate value to produce the correct Y coordinate for each respective X coordinate. By producing the cumulative Y using Y increment at the increased scale factor, errors in the Y coordinate value due to an error in the cumulative Y increment due to the lower scale factor of Y increment are avoided.

The compiler used in the preferred embodiment to perform the method described herein is shown in the program listings written in Motorola 68000 assembler language and contained within six modules. These program listings are shown in U.S. Pat. No. 4,623,977 issued Nov. 18, 1986 and commonly assigned, and whose disclosure is specifically incorporated by reference herein.

The first module is the main program utilizing the control modules shown as modules 2–7. Its function is to access the pack data and interpret the knot locations and control codes therein.

Module 2 is a subset of module 1 and is used to evaluate each complete information set, identifying the Case and control code value thereof.

Module 3 is the compiler described earlier, which functions according to equations 3.1 and 3.2. and which compiles the knot locations, the angles of the curve at the knots, and the related values of the parameter t to produce the node locations on the curve segment locus.

Module 4 is the compiler which operates according to the method of auto-scaling linear interpolation shown herein.

Module 5 is a module which receives curve coordinate data, corresponding to the display coordinate system and sorts this data in the order of the raster lines on the display, so that the display data is accessed in timed relation to the generation of the raster lines, with data for display on any one particular raster line accessed in time with the location of the imaging beam at that raster line.

Module 6 is a general purpose memory allocation and release mechanism for buffer and raster line data.

Module 7 is an apparatus for performing general trigonometry.

As said, these modules are written in 68000 assembler code as used in the preferred embodiment to perform the invention as described. The language for the preferred embodiment is further compiled into machine object language for use on the Motorola 68000.

What is claimed is:

1. A method of creating a data base on storage media including the steps of a method for (i) generating a series of signals representing nodes on a locus of a curve partially defined by a set of related knots, encoded as data, with said knots defining the end points of respective segments of said curve locus and with said knots being in a successive order in relation to said locus, and for (ii) encoding said node signals as data for use when representing said curve segments in a separate additional process responsive to the shape of said curve locus, as represented by said encoded node signals, and said method of creating the data base further comprising the steps of:

(a) defining the locations and the successive order of said knots on said curve locus and encoding as data on a storage media, signals indicative of said knots,
(b) for a first knot, ($Z_a$), representing a first end point of a first curve segment, deriving a first angle, indicative of the average of the interknot angles between said first knot ($Z_a$), and selected related knots, and encoding as data, in computer memory, signals indicative of said first angle,
(c) at a second of said knots ($Z_b$), representing a second end point of said first curve segment, establishing a second angle for said first curve segment, and encoding as data in the computer, signals indicative of said second angle,
(d) establishing a compiler in computer memory, which compiler generates locus points for compiling data according to a predetermined cubic parametric polynomial function between a parameter "t", said knots and said angles at said end points of said first curve segments and the locus of a said first curve segment,
(e) establishing a limited range "R" of values for said parameter "t" in the compiler,
(f) in the computer memory, applying said signals indicative of said locations of said first and second knots of said first curve segment, to said compiler,
(g) in the computer memory, applying said signal indicative of the said first and second angles of said first curve segment to said compiler,
(h) applying a signal indicative of a distinct selected value of said parameter "t" within said range "R", to said compiler to derive a signal indicative of a respective node location on said first curve segment,
(i) repeating step (h) by applying signals indicative of additional distinct selected values of said parameter "t", within said range "R", to derive a plurality of signals indicative of respective node locations on said locus of said first curve segment for respective distinct selected values of said parameter "t", and
(j) encoding said signals derived in step (h) and (i), in a data base in memory for later sorting to represent said first curve segment for later generation of a visual representation of said curve by using said data signals directly to control display process and visually display the curve pattern.

2. The method of claim 1, where said interknot angles of step (b) are a first interknot angle $B_1$ formed from a first selected related knot ($Z_b$), to said first knot ($Z_a$) and wherein said first selected related knot is adjacent to said first knot in said successive order and a second interknot angle $B_2$ formed from said first knot to a second selected related knot ($Z_c$), and wherein said second selected related knot is adjacent to said first knot in said successive order.

3. The method of claim 2, wherein said first knot ($Z_a$) is successive to said first selected related knot ($Z_b$) in said outline loop and said second selected related knot ($Z_c$), is successive to said first knot ($Z_a$) in said outline loop and said step (b) of deriving an average angle includes the step (v) of deriving the average of the interknot angles $B_1$ and $B_2$.

4. The method of claim 3, wherein said second angle at said second knot ($Z_b$) is $\theta$ and said first angle at said first knot ($Z_a$) is $\phi$, and said step (d) includes the step (v) of establishing said compiler according to the form $$Z(t)=Z_b+(3t^2-2t^3)(Z_a-Z_b)+r*t(1-t)^2\$_1-s*t^2(1-t)\$_2;$$

where $$\$_1=e^{i\theta}(Z_a-Z_b);\ \$_2=e^{-i\theta}(Z_a-Z_b);\ 0<=t<=1$$

and where $Z_a$ is the said first knot and $Z_b$ is the said second knot and r and s are positive real numbers.

5. The method of claim 4, wherein said angle $\theta$ is an entrance angle for said curve at said second knot ($Z_b$), and said angle $\theta$ is an exit angle for said curve at said first knot ($Z_a$).

6. The method of claim 4, wherein:

$$r=\left|\frac{2*\sin\phi}{(1+|\cos\psi|)\sin\psi}\right|$$

$$s=\left|\frac{2*\sin\theta}{(1+|\cos\psi|)\sin\psi}\right|$$

$$\psi=(\theta+\phi)/2$$

7. The method of claim 1, wherein step (b) and (c) includes the step (m) of referencing said first and second angles of said first curve segment, to a first of said interknot angles between said second knot ($Z_b$), and said first knot ($Z_a$).

8. The method of claim 7, wherein step (d) includes the step (n) of establishing said compiler in a Hermite form.

9. The method of claim 1, wherein said step (h) includes the step (q) of establishing an incremental value of said parameter "t" and applying a multiple of said incremental value as said distinct selected value.

10. The method of claim 9, wherein said step (a) of defining the said locations of said knots includes the step (r) of defining said knot locations with reference to an encoding grid having first and second coordinates and said step (q) includes the step (s) of establishing said incremental value of said parameter "t" as a multiple of the reciprocal of the distance between said first and second knots.

11. The method of claim 1, wherein said step (a) of defining said successive order of knots, defines an outline loop and step (j) of encoding said knot signals includes the step (t) of encoding said knot signals in a data order defining a data loop, which is indicative of the said knot order and said outline loop, respectively.

12. The method of claim 11, wherein step (j) includes the step (u) of encoding said node signals in an order in said data loop, indicative of the order of said nodes with respect to the said knot order in the said outline loop.

13. The method of claim 1, including the step (k) of repeating steps (b) through (j) for at least a second curve segment within the said locus of said curve.

14. The method of claim 1, wherein said step (d) of establishing said compiler in memory includes the step (l) of establishing said compiler in Hermite form.

15. The method of claim 1, wherein step (a) of defining the said locations of said knots includes the step (o) of defining said knots locations with reference to an encoding grid having first and second coordinates and said step (e) of establishing a range "R" of values for said parameter "t" includes the step (p) of defining said values independently of said first and second coordinates.

16. The method of claim 1, wherein said step (a) includes the step (w) of encoding the coordinate positions of said knots with regard to a normalized encoding grid defining an outline loop at a normalized size and generating scaled knot coordinates with regard to a display coordinate grid, defining the said outline loop at said scaled size.

* * * * *